US012652265B2

(12) United States Patent　　　　(10) Patent No.:　US 12,652,265 B2

Inbal　　　　　　　　　　　　　　　(45) Date of Patent:　　　Jun. 9, 2026

(54) APPLICATION-AGNOSTIC PUNCTURING OF NETWORK ADDRESS TRANSLATION (NAT) SERVICES

(71) Applicant: LIVEU LTD., Kfar Saba (IL)

(72) Inventor: Assaf Inbal, Tzur Yitzhak (IL)

(73) Assignee: LIVEU LTD., Kfar Saba (IL)

( * ) Notice: Subject to any disclaimer, the term of this patent is extended or adjusted under 35 U.S.C. 154(b) by 27 days.

(21) Appl. No.: 18/636,291

(22) Filed: Apr. 16, 2024

(65) Prior Publication Data

US 2024/0356849 A1　　Oct. 24, 2024

Related U.S. Application Data

(60) Provisional application No. 63/497,874, filed on Apr. 24, 2023.

(51) Int. Cl.
| *H04L 61/2592* | (2022.01) |
| *H04L 45/00* | (2022.01) |
| *H04L 45/741* | (2022.01) |
| *H04L 61/2575* | (2022.01) |

(52) U.S. Cl.
CPC ........ *H04L 61/2592* (2013.01); *H04L 45/566* (2013.01); *H04L 45/741* (2013.01); *H04L 61/2575* (2013.01)

(58) Field of Classification Search
CPC ............. H04L 61/2514; H04L 61/2521; H04L 61/256; H04L 61/2564; H04L 61/2567; H04L 61/2575; H04L 61/2578; H04L 61/2589; H04L 61/2592
See application file for complete search history.

(56) References Cited

U.S. PATENT DOCUMENTS

| 8,804,697 | B1 * | 8/2014 | Capper | ............... | H04L 65/1069 |
| | | | | | 370/352 |
| 2007/0076729 | A1 * | 4/2007 | Takeda | ................ | H04L 61/2564 |
| | | | | | 370/401 |
| 2012/0113977 | A1 * | 5/2012 | Shimoosawa | ....... | H04L 61/2575 |
| | | | | | 370/352 |
| 2013/0039364 | A1 * | 2/2013 | Pankratov | ............. | H04L 67/141 |
| | | | | | 370/389 |

* cited by examiner

*Primary Examiner* — Vivek Srivastava
*Assistant Examiner* — William C Mcbeth
(74) *Attorney, Agent, or Firm* — AlphaPatent Associates Ltd.; Daniel J. Swirsky

(57)　　　　　　ABSTRACT

Two electronic devices attempt to communicate and exchange Internet Protocol (IP) packets over a cellular communication network, and at least one of the two devices is behind a symmetric Network Address Translation (NAT) service. At least one of the two devices executes a Session Traversal Utilities for NAT (STUN) protocol, which provides to that device a pair of external IP address and port of that device; which that device then informs to a Message Broker Unit that is accessible to both devices via the public Internet. The Message Broker Unit provides the external IP address and port of that device, to the other device; which then connects to a Virtual Private Network (VPN) server and sends to the first device one or more User Datagram Protocol (UDP) packets that penetrate or puncture the NAT service in an application-agnostic manner.

19 Claims, 9 Drawing Sheets

APPLICATION-AGNOSTIC PUNCTURING OF NETWORK ADDRESS TRANSLATION (NAT) SERVICES

CROSS-REFERENCE TO RELATED APPLICATIONS

This patent application claims benefit and priority from U.S. 63/497,874, filed on Apr. 24, 2023, which is hereby incorporated by reference in its entirety.

FIELD

The present invention is related to the field of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

The present invention may provide devices, systems, and methods for application-agnostic puncturing or penetration of Network Address Translation (NAT) services.

Two electronic devices attempt to communicate and exchange Internet Protocol (IP) packets over a cellular communication network. At least one of the two devices is behind a Symmetric Network Address Translation (NAT) service. At least one of the two devices executes a Session Traversal Utilities for NAT (STUN) protocol, which provides to that device a pair of external IP address and port of that device; which that device then informs to a Message Broker Unit that is accessible to both of the devices via the public Internet. The Message Broker Unit provides the external IP address and port of that device, to the other device of the two devices; which then connects to a Virtual Private Network (VPN) server and sends to the first device one or more User Datagram Protocol (UDP) packets that penetrate or puncture the NAT service in an application-agnostic manner.

Some embodiments may provide other and/or additional benefits and/or advantages.

DETAILED DESCRIPTION OF SOME DEMONSTRATIVE EMBODIMENTS

The term "NAT" as used herein may include, for example, a Network Address Translation service or unit or system or sub-system or router or communication switch; or other network element, or set of network elements, that perform mapping or re-mapping of an Internet Protocol (IP) address space into another address space, particularly (as a non-limiting example) by modifying network address information in the IP header of IP packets (and/or by modifying or replacing Source Port/Destination Port of TCP/UDP packet headers) while they are in transit across a traffic route or as they are being transported along a traffic route or prior to their transport or prior to their relay; including, as a non-limiting example, a basic NAT or a one-to-one NAT or a full-cone NAT, which provides one-to-one translation of IP addresses (e.g., in accordance with RFC 2663 or other suitable mechanism); or including, as a non-limiting example, a one-to-many NAT in which multiple private hosts (or User Equipment (UE) devices) are mapped to one publicly-exposed/publicly-visible IP address (e.g., in accordance with RFC 1918 or other suitable mechanism); or a Full-Cone NAT (in which: once an internal address (iAddr: iPort) is mapped to an external address (eAddr:ePort), any packets from iAddr:iPort are sent through (eAddr:ePort); and any external host can send packets to (iAddr:iPort) by sending packets to (eAddr:ePort); or a Restricted Cone NAT, or an Address-Restricted-Cone NAT (in which: once an internal address (iAddr:iPort) is mapped to an external address (eAddr:ePort), any packets from the internal address (iAddr:iPort) are sent through the external address (eAddr: ePort); and an external host (hAddr:any) can send packets to the internal address (iAddr:iPort) by sending packets to the external address (eAddr:ePort) only if the internal address (iAddr:iPort) has previously sent a packet to the external host (hAddr:any), wherein "any" indicates that the port number does not matter); or a Port-Restricted-Cone NAT (e.g., similar to an Address-Restricted-Cone NAT, yet the restriction includes port numbers; in which: once an internal address (iAddr:iPort) is mapped to an external address (eAddr:ePort), any packets from the internal address (iAddr: iPort) are sent through the external address (eAddr:ePort); and an external host (hAddr:hPort) can send packets to the internal address (iAddr:iPort) by sending packets to the external address (eAddr:ePort) only if the internal address (iAddr:iPort) has previously sent a packet to the external host (hAddr:hPort); a Symmetric NAT (in which: the combination of one internal IP address plus a destination IP address and port is mapped to a single unique external source IP address and port; and if the same internal host sends a packet even with the same source address and port but to a different destination, then a different mapping is used; and only an external host that receives a packet from an internal host can send a packet back); a NAT system or unit that utilizes or enforces or performs Address-Dependent Filtering and/or Port-Dependent Filtering and/or Address-and-Port Dependent Filtering; a Carrier Grade NAT (CG-NAT or CG-NAT); a Large-Scale NAT (LSN); a NAT or LSN or CGNAT operated by an Internet Service Provider (ISP) or by a cellular communications provider or a cellular network operator or an Internet connectivity provider or a cellular connectivity provider; a NAT that operates in conjunction with IPv4 address space and/or IPv6 address space; and/or other units or systems, or address/port translation or mapping units. The routing or mapping decisions, including those for allowing access or preventing access, are part of the control flow of NAT protocol(s), and can be referred to as "rules" or "NAT rules".

Some of the mentioned types of NAT, as well as potentially other/future types of NAT, may block communications between two computing devices or two UE devices that reside on different IP networks or sub-networks; because packets sent by either of these two devices are blocked by the NAT entities of the other network, as the other UE device has not "invited", or had not yet sent a first packet, to the first UE device. Some use cases, such as those targeted by some embodiments of the present invention, require or desire to allow such communications between two UE devices that are behind such restricting NATs; and this process may be called "NAT puncturing" or "NAT penetration".

Some embodiments provide methods, systems, and devices to enable one or more computing devices or User Equipment (UE) devices (e.g., a computer, a desktop computer, a laptop computer, a smartphone, a tablet, or the like), residing or installed or operable behind NATs, to communicate with each other by performing NAT puncturing with regard to any or all types of NAT; including NAT types that conventional systems may regard as not puncturable or requiring middle/proxy device for puncturing or special additional protocol such as TURN deployed on their devices for that specific purpose (as well as such that are regarded as puncturable).

Some embodiments use a mechanism that is based on a Virtual Private Network (VPN), before using NAT puncturing protocols such as Session Traversal Utilities for NAT (STUN), and/or without utilizing or relying on any Traversal Using Relays around NAT (TURN) protocols or mechanisms.

The Applicant has realized that while many networks employ a port-restricted NAT, approximately 40 percent of the sampled cellular operators used one or more Symmetric NATs. of networks or over a combination of networks, or when the Internet or other regional/global communication system is involved, there may be additional considerations that need to be considered. For example, realized the Applicant, in some cases, either or both of these entities or devices may be in a private network (e.g., a network that is not directly accessible from the public Internet). These types of networks, also common in many homes and in many organizational/enterprise/corporate systems, employ a NAT service or a NAT component, such as on or in the router or gateway or communication switch, which provides the necessary IP address conversions or translations or mapping to allow network connectivity.

FIG. 1 is a schematic illustration of a system 100 utilizing a NAT service; wherein the NAT service of such system can be punctured in accordance with some embodiments of the present invention. System 100 demonstrates a User Equipment (UE) 101, a remote server 104; a router 102, and a communication network 103 such as the Internet.

For example, a user utilizes the UE device or a computing device, and wishes to browse to Google.com; her device has an IP address, such as (192.168.1.10); her device creates a Transmission Control Protocol (TCP) connection from a random port (e.g., 13524) to the server of Google® (e.g., IP address 216.58.212.174) on the HTTPS port (443). Since the server of Google® will not be able to respond to the internal address, a router (e.g., 192.168.1.1/199.203.140.1) will operate to replace the source IP:Port of 192.168.1.10:13524 with its own 199.203.140.1:8687, and would leave the destination as it is (216.58.212.174:443). When a response is ready, the server of Google® will send the response to 199.203.140.1:8687; and the router will modify the destination to the internal address 192.168.1.10:13524 such that the response would reach that end-user device.

As a part of this process, when a client on the private network (or any network that resides behind a networking and address mapping component) wants to access a server on the public network (or connected via a networking device to the public network), the router adds an address translation entry for itself, so that it will know what to do when it receives a reply from the server of Google®, i.e., change the destination address of the response to the private address of the client device that had initiated the request.

In another scenario, the roles are reversed, and the server of Google® wants to initiate a connection towards the end-user device which has the private address. The server would need to initiate a request to the router's public address (199.203.140.1); when that request reaches the router, the router would not know what to do with that connection, as it has not yet created the internal address translation rule; and the router would drop or discard or ignore the incoming request from the server.

Entities that are authorized to access or to modify or to manage the router's (or other networking component) NAT configuration, may be able to add an address conversion rule to such router or to such network element, in order to perform ruled-based, static, "port forwarding".

Conversely, realized the Applicant, if the user of the UE does not have access to the router, or if such access is privileged or is not authorized, or if an application running on that UE or end-user device does not want to force the user to create static port forwarding rules, or does not want to rely on the user's executing or implementing such static port forwarding rules, then NAT puncturing techniques may be utilized.

NAT puncturing is a process that may include one or more procedures or techniques to allow direct network communication between two entities or devices that reside on two different networks, without the need to define or configure or deploy any NAT/Firewall along the route between those two entities or devices. Such procedures usually require an initial means of communication to exchange information, and this may be assisted by a "message broker" entity that is reachable on the public Internet. For example, some VoIP applications (e.g., Zoom®, Microsoft® Teams®) install or deploy their own broker servers on the public Internet, to allow two end-user devices to initiate a communication channel; but the audio/video traffic itself is sent directly from one end-user device to the other end-user device, via a NAT puncturing technique.

Some systems utilize Session Traversal Utilities for NAT (STUN). For example, once the two entities have the means to exchange messages, they can decide on how to initiate a direct connection between them. The first thing that they need to know is their external IP address. To do that, they can make use of a STUN server. Each device connects to the (publicly available) STUN server; which, in turn, responds to each device with the public IP address of that device and the port from which the STUN server received the connection, and thus each device knows its own publicly-visible IP: port data. This then enables each device to know what address conversion(s) or address translation(s) or address mapping(s) were performed by any NAT servers/Firewalls along the way.

For demonstrative purposes, some portions of the discussion herein or above may refer to two devices such that one of the devices is a "client" device, and the other one is a "server" device; however, this is only a non-limiting example for purposes of clarity of the discussion, and some embodiments may similarly operate in conjunction with any two other types of devices, for example, non-server devices, end-user devices, smartphone, tablet, laptop computer, desktop computer, smart-watch, gaming device or gaming console, smart television, Internet-connected device or sensor (e.g., Internet-connected camera or sensor), or the like.

Using the IP and port information acquired from the previous step, the client device can send a packet to the server in order to create a dynamic mapping on its NAT. This packet does not necessarily reach the server, as the server may be behind its network or subnetwork or own NAT or multiplicity of combinations of such, but it will allow packets from the server to reach the client device. Then, the server will do the same to create a mapping on its NAT; and by creating dynamic and usually temporary mapping rules on both NATs (by the components and without the User intervention), the client device and the server can now communicate with each other directly.

Reference is made to FIG. 2, which is a chart 200 of operations demonstrating a NAT puncturing process, in accordance with some demonstrative embodiments. For example, a client device 201 and a server 206 are the two entities; the client device 201 is behind a client-side NAT 202; the server 206 is behind a server-side NAT 205; a message broker 203 and a STUN (or similar current/future protocol) server 204 may assist in NAT puncturing.

As demonstrated in FIG. 2, Client Device 201 sends to Message Broker 203 a connection request (211). Message Broker 203 sends a connection request (212) to server 206. Server 206 sends to STUN Server 204 a request (213A) to get the external IP address and port of Server 206. In response, STUN server 204 sends back (213B) to Server 206 the requested external IP address and port of Server 206. Server 206 then sends to the Message Broker 203 a connection response (214) having those external IP address and port of Server 206, and that connection response (214) is a non-limiting example of a first Informing Message.

Message Broker 203 then sends to Client Device 201 a connection response (215) having those external IP address and port of Server 206. Client Device 201 sends to STUN server 204 a request (216) to get the external IP address and port of Client Device 201. In response, the STUN server 205 sends back (217) to Client Device 201 the external IP address and port of Client Device 201.

Application traffic is sent (218) from Client Device 201 to Server 206, passing through Client-Side NAT 202; which creates a NAT rule (219). Application traffic is forwarded (220) from the Client-Side NAT 202 to the Server-Side NAT 205, and is blocked (221).

Client Device 201 sends (222) to the Message Broker 203 a Puncture Request, as a non-limiting example of a Second Informing Message, indicating the external IP address and port of the Client Device 201. Message Broker 203 sends (223) that Puncture Request to Server 206. In response, Server 206 sends an empty UDP packet (224) directed to the external IP address and port of Client Device 201; the Server-Side NAT 205 creates a NAT rule (225), and sends (226) that empty UDP packet towards that external IP address and port of Client Device 201; the Client-Side NAT 202 allows (227), and the empty UDP packet arrives (228) to the Client Device 201. From here and onward, Client Device 201 can send application traffic (229) to Server 206, and the Server-Side NAT 205 allows (230) such application traffic (230, 231) to reach Server 206.

Reference is made to FIG. 3, which is an illustration 300 demonstrating NAT puncturing in the context of a Multi-Media Hub (e.g. a multi-media server) or any other UE or server, and an end-unit, in accordance with some demonstrative embodiments. It is clarified that the Multi-Media Hub (MMH) or similar Multi-Media Server are shown only as a non-limiting example; and various other types of server, computer, computing device, or other electronic devices may be used.

For example, the following steps may be performed: (1) MMH is configured to listen on a specific UDP port, e.g., 5000; (2) Unit initiates a stream request via the message broker (Hub); (3) MMH gets its external IP address and port from STUN; (3) MMH responds to the stream initiation request with its IP address and port; (4) Unit gets its external IP address and port from STUN server; (5) Unit sends that information (Unit's external IP address and port) to MMH; (6) MMH punctures its own NAT in a similar process; (7) Video (or audio, or audio-and-video video) packets (or other types of packets) can now be sent from Unit to MMH, and/or from MMH to Unit, and/or other data can now be exchanged between Unit and MMH as each of these two devices now knows the external IP address and port of the other device, and their respective NATs have been dynamically configured with appropriate IP/UDP mapping rules.

The Applicant has realized that conventional NAT puncturing techniques may suffer from some limitations. For example, there can be various or multiple types of NAT configurations, with a strict configuration of a Symmetric NAT: it creates a mapping that is dependent of the destination server, such that the external port used by the NAT will be different for each destination that the client tries to reach. The Applicant has realized that this can be a problem for conventional NAT puncturing techniques. For example, when connecting to the STUN server, one external port is used; and when attempting to connect to the target server, a different external port is used most times. In such situation, the response received by the STUN server will not be relevant when connecting to the target server, and the NAT cannot be punctured using a conventional method.

Reference is made to FIG. 4, which is an illustration 400 demonstrating a Symmetric NAT system that cannot be punctured via conventional NAT puncturing techniques; yet some embodiments of the present invention may be able to achieve NAT puncturing of such Symmetric NAT system.

For example, conventional NAT puncturing techniques rely on the fact (or the assumption) that if the MMH (or any end device or traffic generating/receiving device) used the same source port for both STUN and LiveU Reliable Transport (LRT) or any transport or IP traffic protocols or user or application IP data, then the NAT would also use the same external port; however, a Symmetric NAT does not operate this way, and a conventional NAT puncturing technique cannot puncture a Symmetric NAT.

The Applicant has realized that in some situations, an end-user device may be able to stream live audio/video towards a remote server when a client-side NAT and/or a server-side NAT exist/s between them, by utilizing a conventional NAT puncturing technique; whereas, in other situations, the end-user device is not able to stream live audio/video towards the remote server, when a client-side NAT and/or a server-side NAT exist between them, by utilizing a conventional NAT puncturing technique, and in those situations some embodiments of the present invention may provide an innovative NAT puncturing technique that may enable such streaming.

The following table, denoted Table 1, demonstrates three types of configurations. In a first type, indicated by "Yes", conventional NAT puncturing techniques can operate effectively. In a second type, indicated by "Yes (if)", conventional NAT puncturing techniques can operate effectively if and only if the server initiates the first connection towards the end-unit, and not vice versa. In a third type, indicated by "No", conventional NAT puncturing techniques cannot operate effectively. In contrast to conventional techniques, the innovative NAT puncturing techniques of the present invention can operate effectively in all three types of configurations of Table 1.

TABLE 1

| Server-Side NAT | Client-Side NAT | Possible to communicate? |
|---|---|---|
| Symmetric | Symmetric | No |
| Symmetric | Port Restricted | No |
| Symmetric | Address Restricted | Yes (if the server initiates the first connection) |

TABLE 1-continued

| Server-Side NAT | Client-Side NAT | Possible to communicate? |
|---|---|---|
| Symmetric | Full-Cone | Yes (if the server initiates the first connection) |
| Symmetric | Open Internet | Yes (if the server initiates the first connection) |
| Port Restricted | Symmetric | No |
| Port Restricted | Port Restricted | Yes |
| Port Restricted | Address Restricted | Yes |
| Port Restricted | Full-Cone | Yes |
| Port Restricted | Open Internet | Yes |
| Address Restricted | Symmetric | Yes |
| Address Restricted | Port Restricted | Yes |
| Address Restricted | Address Restricted | Yes |
| Address Restricted | Full-Cone | Yes |
| Address Restricted | Open Internet | Yes |
| Full-Cone | Symmetric | Yes |
| Full-Cone | Port Restricted | Yes |
| Full-Cone | Address Restricted | Yes |
| Full-Cone | Full-Cone | Yes |
| Full-Cone | Open Internet | Yes |
| Open Internet | Symmetric | Yes |
| Open Internet | Port Restricted | Yes |
| Open Internet | Address Restricted | Yes |
| Open Internet | Full-Cone | Yes |
| Open Internet | Open Internet | Yes |

As demonstrated by Table 1, when Symmetric NATs are involved, the conventional STUN-based NAT puncturing technique does not succeed if the other NAT is symmetric or port-restricted. The Applicant has realized that Port-Restricted NATs and/or Symmetric NATs are quite common; and therefore, even though Table 1 has many rows with "Yes" and few rows with "No", actual deployment scenarios may frequently run into those "No" cases in which Port-Restricted NATs and/or Symmetric NATs are involved and prevent communication between two particular UE devices, or between a UE device and a server.

The Applicant has further realized that for Symmetric NATs, a different solution is sometimes attempted in the form of a "Traversal Using Relays around NAT" (TURN) server in addition to (e.g., not replacing) running STUN. For example, a publicly available server is accessible to the two devices, and it proxies the information between the two devices. However, using a TURN server is more complex, and adds additional overhead and possibly communication delays.

For example, in a two-device scenario that has a client device and a server, the server needs to connect to such TURN server and to request it to allocate a public IP/port that client devices may use to reach the server. The server also needs to request permissions before sending data to any of its client devices. In addition, any data packet that the server wants to send to any client's device, needs to include a TURN-specific header, informing the TURN server to which client device this response should be sent. Data received at the server from the client device is similarly prefixed with a TURN header, notifying the server from which client device this data was received. Furthermore, the server holds a single connection/socket towards the TURN server (e.g., with regard to multiple client devices that the server serves), instead of a more "conventional" configuration of one connection/one session per client device, thereby breaking even more the paradigm of some applications. Furthermore, realized the Applicant, the above-mentioned operations typically require an application-specific integration.

Additionally, utilization of TURN server and TURN headers may require any application that needs the communication using NAT puncturing to utilize one or more external libraries, which may not always be easy to integrate into a conventional application, or which may not always be allowed to be added to a conventional application (e.g., due to licensing reasons; such as, an application is closed-source or proprietary, and needs to use an open source/GPL library for TURN integration). In some situations, depending on the application's complexity, it may take several man-years of effort to develop or to integrate such TURN support; thus creating a real barrier to developing or augmenting some types of applications that rely heavily on point-to-point communications (e.g., real-time audio/video/chat or data or sensors-data streaming applications), and/or creating barriers for porting or developing an application across programming languages/across Operating Systems.

Additionally or alternatively, realized the Applicant, the application and/or the developers in many cases do not know in advance over which types(s) of NAT(s) the communication will be done, particularly over the full life-span of that application (which may be years into the future), and even more so as the numerous network operators may change or upgrade their network deployments at any future time, unknowingly to the developers and/or the application; and in such situations, realized the Applicant, the already-deployed/already-launched application might stop working, or might not work on or across some particular communication networks or cellular network; especially in some use cases, such as if TURN is not added to the STUN. Hence, realized the Applicant, it may be good practice for application developers to implement tailored—in TURN, which makes the application code more complex, less portable, handle inside it unnecessary issues, rely on external libraries, and more susceptible to security and fault issues, merely to be on the safe side trying to not restrict the application deployment. Therefore, realized the Applicant, the "No" cases in Table 1 above can be found in many applications and may burden the development or deployment of applications. In contrast, embodiments of the present invention may resolve (or prevent, or mitigate, or eliminate) this issue, and may release application developers from the error-prone and effort-consuming burden of having to obtain such a priori knowledge, or of the risk of already-launched/already-deployed applications suddenly stopping to work (or, performing only some of their features and not all of their intended features) if not by themselves implementing TURN (or similar) protocols.

Furthermore, realized the Applicant, in some situations, an application that has already generated the payload that it wants to send out, or already received or obtained or downloaded such payload from an external source, now has the added overhead of prepending the relevant TURN header; often causing or requiring numerous memory copy operations, which may prove troublesome in demanding applications (such as in terms of additional required memory, processing power, cost, unnecessary latency being added, additional power being consumed and heat and carbon being generated, reducing hardware longevity, or the like) and/or which can be error prone or may even cause potential security vulnerabilities (e.g., complicated memory copy operations or memory allocation operations can sometimes cause a security exposure that did not otherwise exist without them). In addition, utilization of TURN support libraries from external sources, further create or augment the risk of supply-chain attacks and other vulnerabilities, which may be introduced-intentionally or unintentionally-into the application or the device it runs in by adopting an externally-provided library for TURN support.

The Applicant has realized that smart and innovative utilization of a Virtual Private Network (VPN), or multiple such VPNs, may assist in enabling NAT puncturing or NAT penetration or NAT bypass, in accordance with some embodiments of the present invention.

In accordance with some embodiments, a VPN allows creating a private network on top of a public network, e.g., over the Internet. For example, a VPN allows multiple users (and their respective UE devices) from across the globe to connect to the same virtual network, as if they were connected to the same physical network. A VPN server is the entity to which such devices (e.g., laptop computers, desktop computers, smartphones, tablets, or the like) connect; and it provides the access to said private network. A VPN can be used to provide access to private resources from outside that network, e.g., connecting to an office network from home, or connecting to an office storage unit from home or from a hotel, or the like. Additional uses for VPN are, for example: to add an extra layer of security; for example, by encrypting all the traffic that the user sends on the Internet; and to spoof or to change one's location or geo-location if the VPN server is located in a different country (e.g., and thus enabling a UE device that is physically located in Country A, to consume content that is typically not served to devices that are in Country A, if the VPN server is located in Country B in which such content can be served and consumed).

Some embodiments of the present invention enable and provide NAT Puncturing/Penetration/Bypassing in 100% of the cases/configurations/scenarios; including the situation of one entity being behind a Symmetric NAT; including the situations of two entities being behind two (different) Symmetric NATs; including cases in which one or more Symmetric NATs are used and also one or more non-symmetric NATs are used, at one or more of the sides of the communication session or route, or anywhere along that communication route; and/or virtually any and all other cases where symmetric NAT is used or is not used at all; and in an application-agnostic manner that (in some embodiments) does not require modification or augmentation of the application itself.

In a demonstrative example, both a server and a client device utilize same or different cellular network(s); and some embodiments of the present invention provide the solution to overcome these problems and to efficiently and effectively provide NAT puncturing/bypassing/penetration, that would work in all cases and for any combination of NAT types.

Moreover, some embodiments of the present invention refrain from using or from requiring any traditional TURN server(s), and thus avoid the various problems that were described above, and any others, with regard to deployment and integration and actual utilization of such TURN server (s).

In contrast to the conventional, limited, configuration that utilizes TURN server(s), some embodiments of the present invention do not require any modifications to core business applications; and such applications would keep working as they were originally designed, developed, and programmed.

Embodiments of the present invention utilize a VPN connection that is established first by the computing device or its Operating System (OS) or drivers or a VPN client or any other component running on the device or from remote, in order to make the STUN-based NAT puncturing method. In some embodiments, a Layer-2 Tunnelling Protocol (L2TP) VPN protocol is used, as it has low network traffic overhead and is UDP based and hence is suitable for low-latency applications such as video streaming or audio streaming or live video streaming or live audio streaming or other live data streaming. However, virtually any current and future VPN protocol(s) may be suitable for utilization in conjunction with embodiments of the present invention, such as Point-to-Point Tunnelling Protocol (PPTP), OpenVPN®, remote access VPN protocols, peer-to-peer VPN protocols, site-to-site VPN protocols, L2TP/IPsec, WireGuard® or similar VPN protocols, or the like.

As mentioned, when Symmetric NAT(s) is used or are used, on the client side and/or on the server side, the conventional NAT puncturing methods fail; or, they fail to operate unless at least one of the two sides is behind an address-restricted NAT or a full-cone NAT or similar less-restrictive NAT or another routing entity employing less-restrictive mapping or forwarding rules. To that end, some embodiments may configure a VPN server to employ a NAT that maps any port from client to be forwarded to the server where, with the above NAT types in mind, this can be either an address-restricted NAT or full-cone NAT.

In some embodiments, since the VPN replaces the default network interface (or driver or other IP protocol stack or transport mechanisms) of the server, it allows and enables all IP traffic to work agnostically and to be application-agonistically transported and delivered to their intended destination. Therefore, in accordance with some embodiments of the present invention, and unlike the limited conventional partial solutions for NAT puncturing, no additions or changes are required at the level of the application (that needs the NAT puncturing). That application is not even aware (unless it specifically and intentionally checks for it) of the network routing changes, and/or of the fact that the computing or networking device used the VPN first.

Reference is made to FIGS. 5A to 5C, to demonstrate some of the distinguishing features and architecture of embodiments of the present invention (FIG. 5C) relative to conventional systems (FIG. 5A and FIG. 5B).

Figure 1:
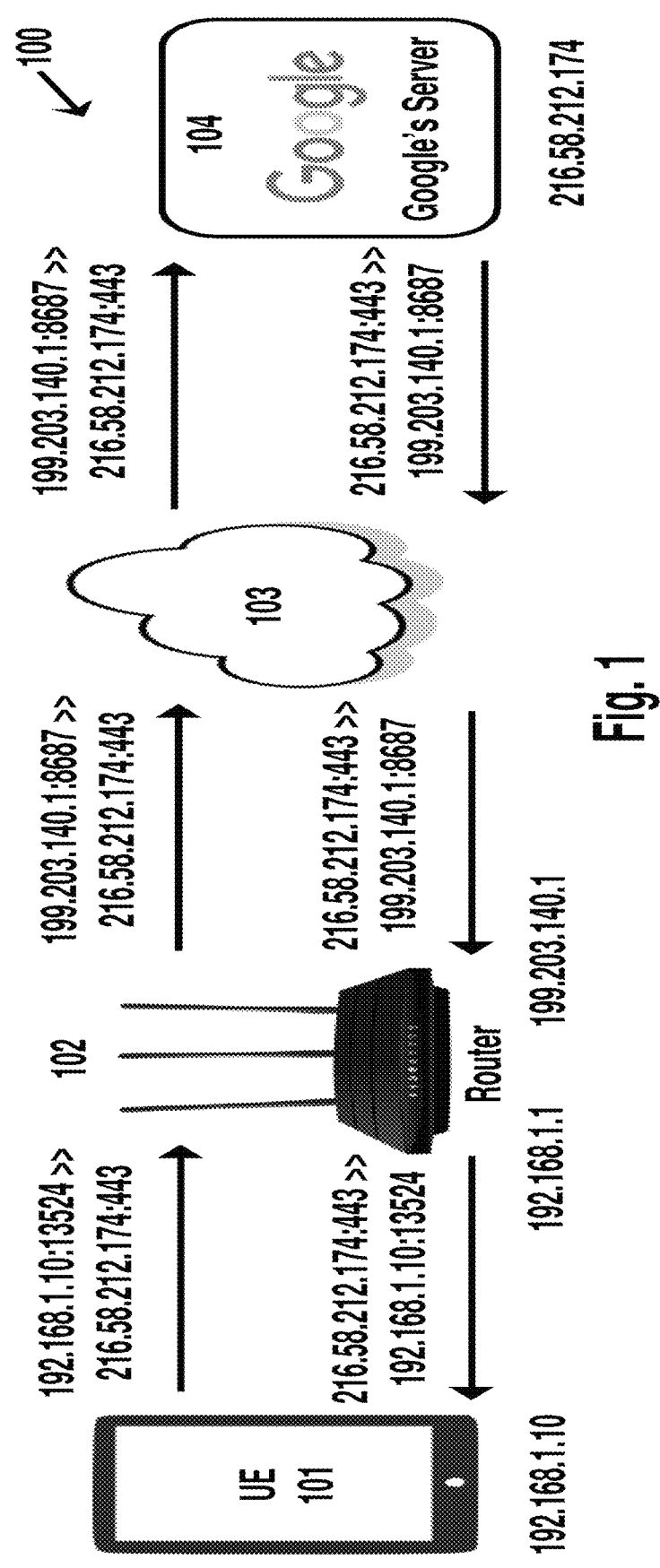
Figure 2:
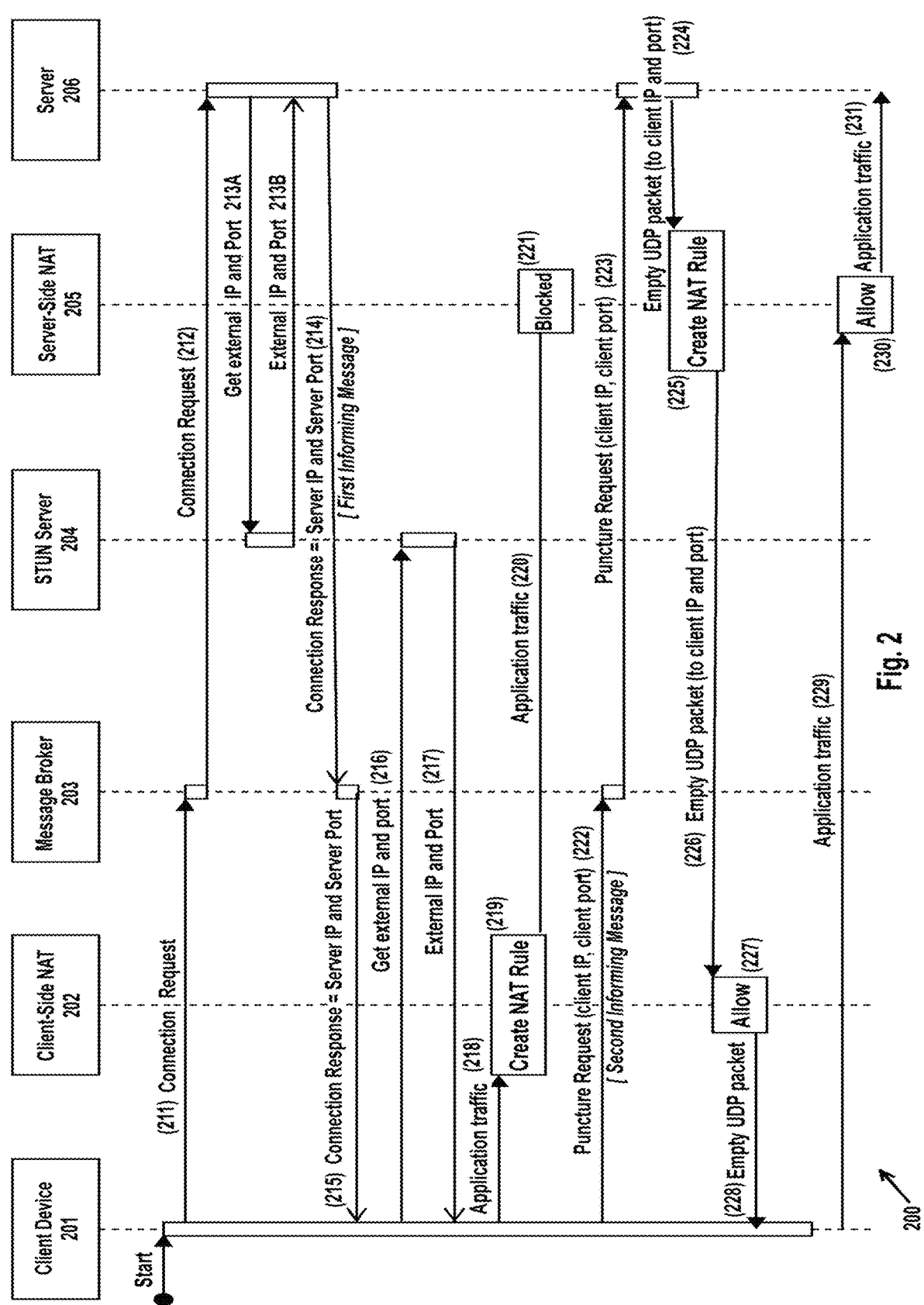
Figure 3:
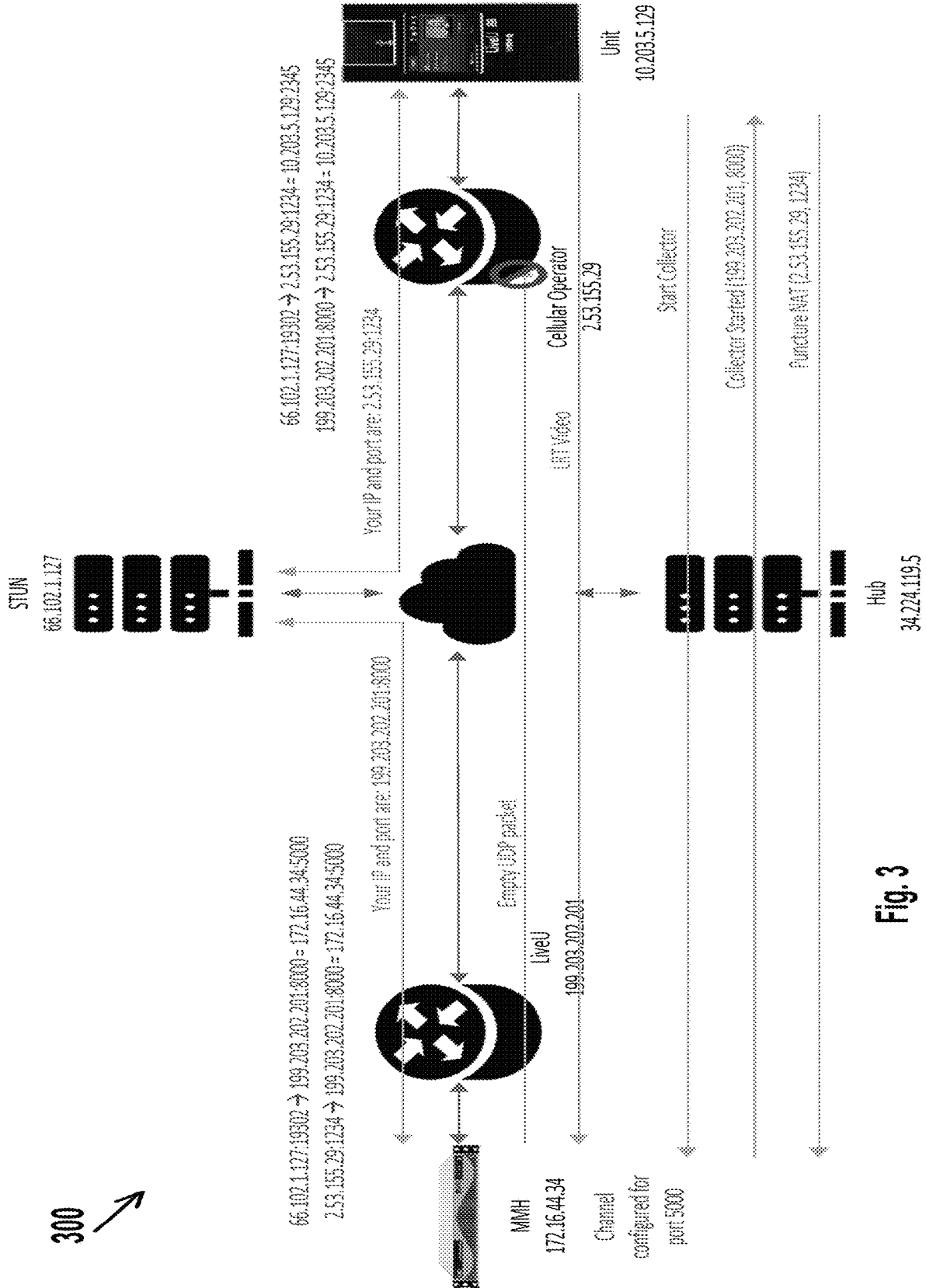
Figure 4:
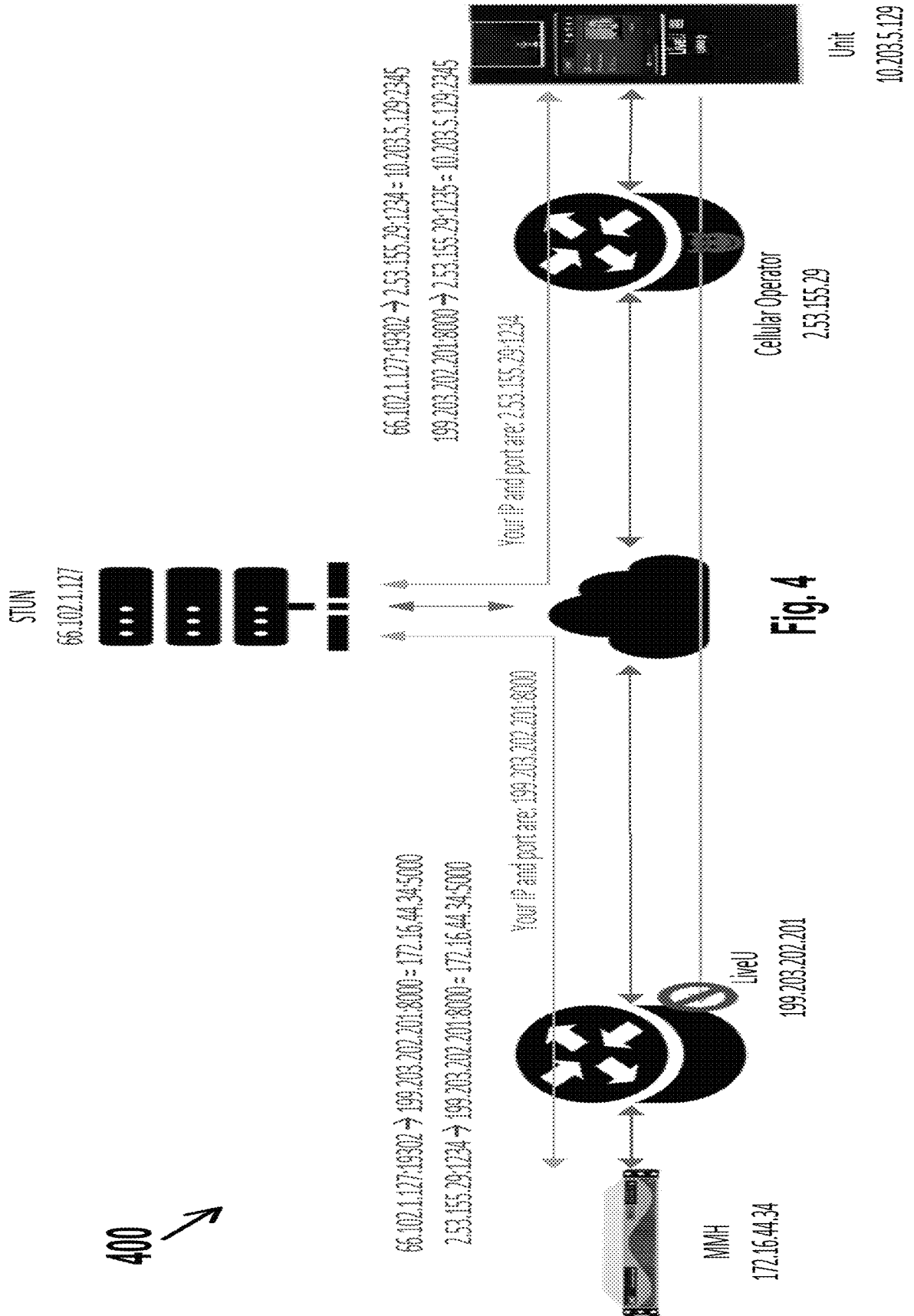
Figure 5A:
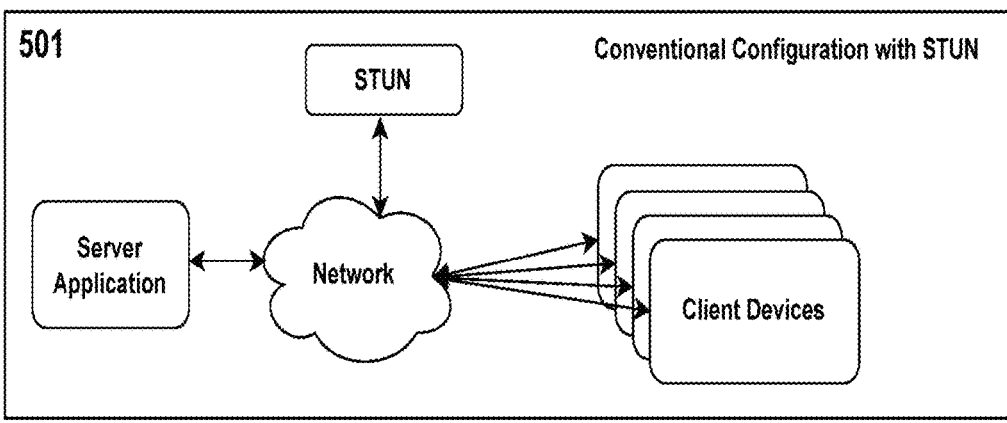
FIG. 5A is a schematic illustration of a conventional system 501 which utilizes a STUN based method for NAT puncturing that can be effective in some, but not all, types of NAT(s) being used.
Figure 5B:
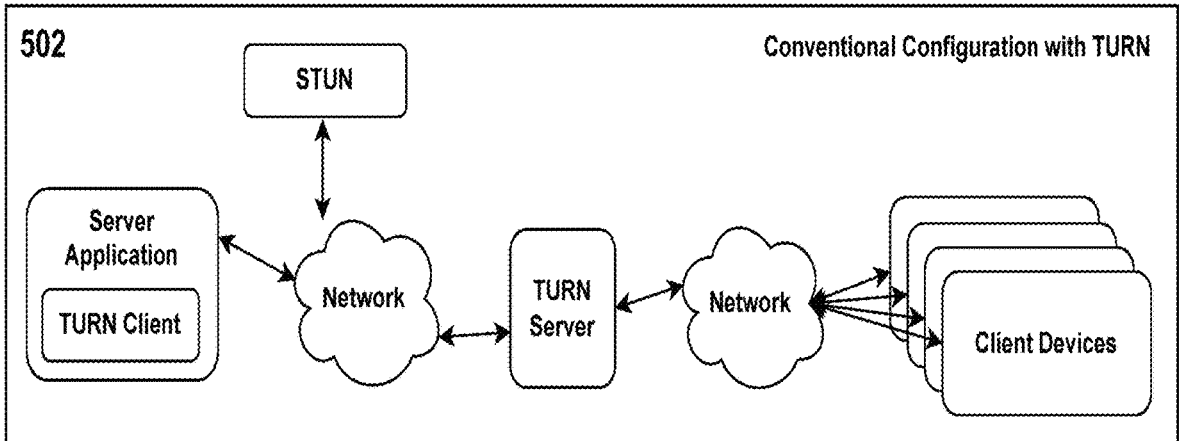
FIG. 5B is a schematic illustration of a conventional system 502 which utilizes a STUN based (or similar current or future protocol) and also TURN based method for NAT puncturing, that can be effective in all types of NAT(s) being used.
Figure 5C:
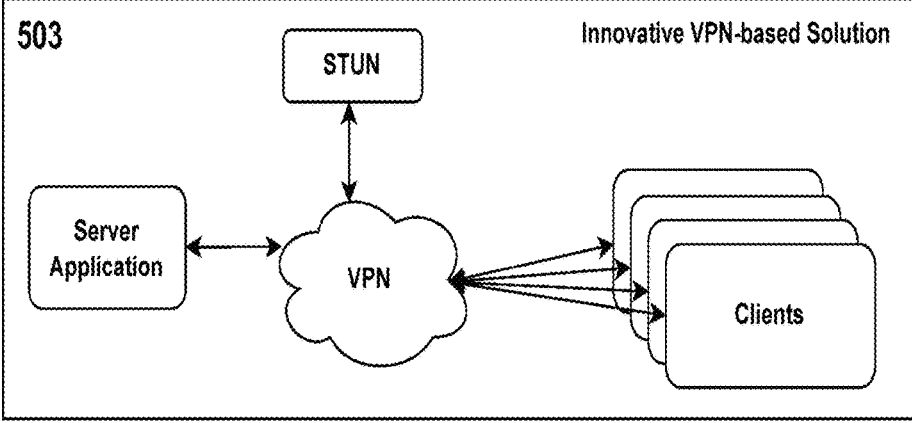

FIG. 5C is a schematic illustration of an innovative system 503, in accordance with some demonstrative embodiments of the present invention, which utilizes a STUN (or similar current or future protocol) based method as well as VPN based method for NAT puncturing, that can be effective in conjunction with virtually any and all types of NATs. System 503 is, or can be, entirely TURN-free or TURN-less; and it excludes, and/or it does not require, and/or it does not include, and/or it does not utilize, and/or it does not utilize, any TURN server or TURN service or TURN router or TURN unit or other TURN network element; and, if such TURN server or TURN network element happens to exist or to be available, the components of system 503 (including the server apparatus and the client UE devices) do not communicate with any such TURN service or any such TURN network element.

It is noted that the TURN-less features and architecture of system 503 are functionally important and can be advantageous to many use cases such as, yet not limited to, use cases associated with some UE communication over cellular link (s) or network(s); as the mere utilization of (or reliance on) a TURN server or a TURN network element can often require increased overhead, is error prone, can cause communication latency or problems, and/or is difficult and time-consuming to develop/integrate/deploy, can possibly introduce security risks and/or security vulnerabilities and/or supply-chain attacks, may increase the required processing power and/or memory in the UE devices, may increase costs, may increase power consumption or dimensions of form-factor of the UE devices, and/or may cause other problems or operational inefficiencies. In contrast, the TURN-less features and architecture of system 503 is free of these problems.

In accordance with some embodiments of the present invention, the system connects the application server (or computing device) that is behind a server-side NAT (or similar routing entity), such as the NAT(s) of a cellular communication provider or operator, to a VPN server (e.g., using a standard open-source VPN protocol/application, or using an OS-integrated VPN module or driver, or using a proprietary VPN protocol/application). Such VPN connection enables and creates a logical routing connection for the packets as a packet gateway or routing path. This connection is therefore usually not a physical cable connection, since usually the NAT-blocked device and the VPN server(s) are remote from each other. In some embodiments, this connection is done via various routing and network devices and routed via different networks, such as: from the cellular network, to the public network, to the network of the VPN server. The VPN server may be inside the same network or may be external to it, such as in another location or as a cloud-based device, and may be operated by any VPN operator or VPN service provider. Once the application server or computing device is connected to the VPN server, all of its network traffic is routed through that VPN server (unless otherwise specifically configured). Applications running on that device are not even aware of it, as this is done without their intervention, without being integrated to any of them, and hence fully transparently and without their code needing to deal with or handle setting the VPN, configuring it or otherwise handling it or the traffic over it. The VPN may be seen as a proxy server for that device's traffic. This means that despite the device being behind a Symmetric NAT of the mobile/cellular network, when that device is accessing the Internet, traffic (namely: packets) goes through the mobile operator's NAT to the public VPN server and from there, through a full-cone NAT, to the public Internet. For all purposes, the VPN's public IP address is used as the server's public IP address. From this point on, any time that the server communicates with the STUN server or with the client UE devices, the server does so from the VPN server's public IP address and NAT.

Figure 6:
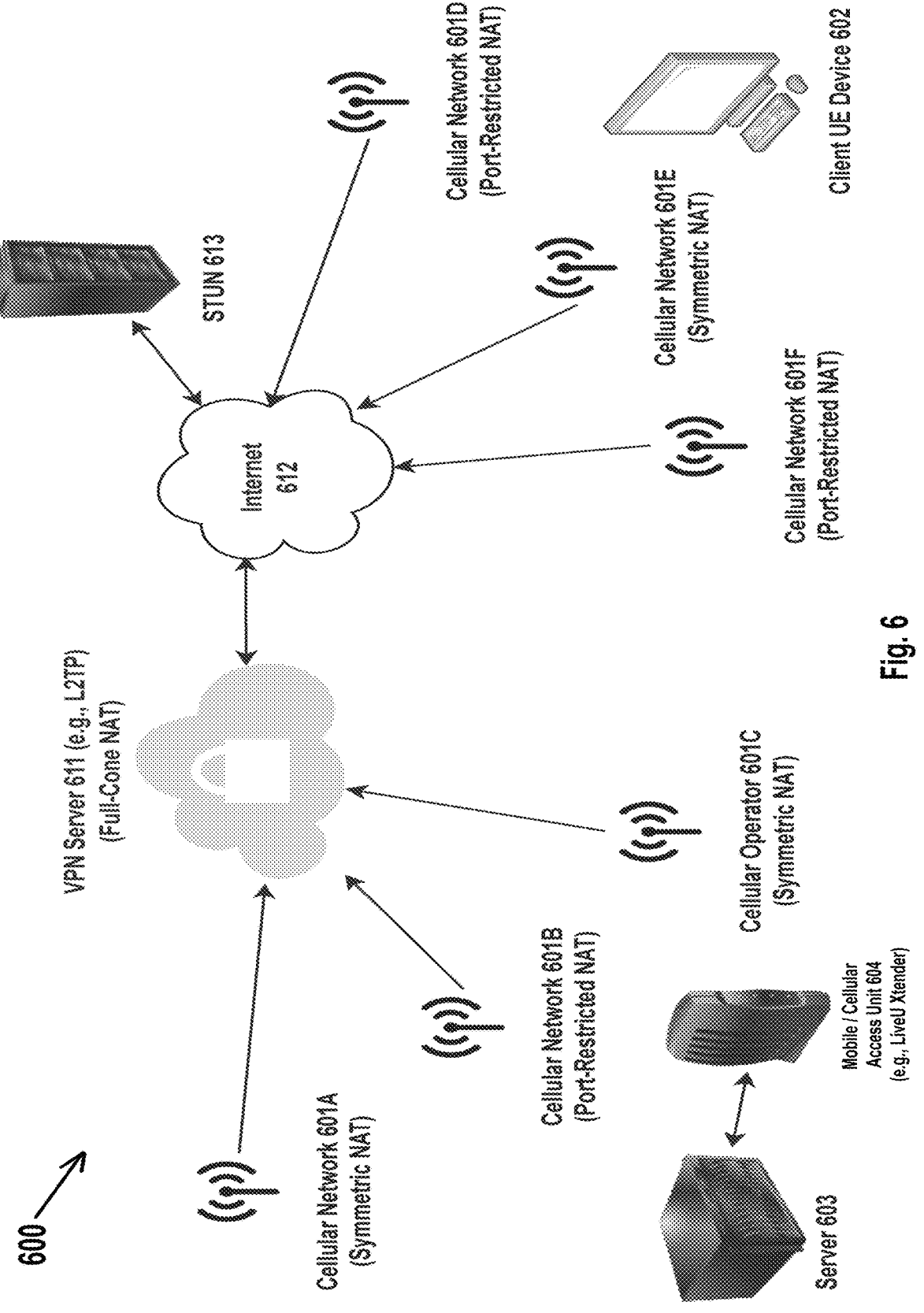

Reference is made to FIG. 6, which is an illustration of a TURN-less system 600 that can effectively perform NAT puncturing/penetrating, in conjunction with virtually any type(s) of NAT(s) (or similar current or future protocol), in accordance with some demonstrative embodiments of the present invention.

For example, a client UE device 602 and a server 603 (e.g., an application server, a web server, a cloud-based server) are the two entities that would like to communicate with each other. The client-and-server architecture that is depicted in FIG. 6, showing a Client device 602 and a Server apparatus 603, is only a non-limiting example; and some embodiments of the present invention may similarly be utilized if/when Client device 602 is actually another Server apparatus, and/or if/when Server apparatus 603 is actually another Client device; and/or if other types of devices are utilized as the two communicating entities; for example:

computer and smartphone; smartphone and smartphone: computer and tablet; tablet and tablet; smartphone and tablet; server and computer; server and laptop computer; server and desktop computer; server and server; server and smartphone; server and tablet; server and gaming device; server and smart television; server and Internet-connected camera; server and Internet-connected sensor; and/or other pairs of electronic devices.

In some embodiments, Client Device 602 may be capable of directly communicating (usually using IP packets) with one or more cellular communication networks; for example, as Client Device 602 may include a cellular transmitter/receiver/transceiver/modem, such as a 5G/4G/3G transceiver, or future versions (e.g., 6G) of cellular transceiver(s). In other embodiments, Client Device 602 may not integrally comprise a cellular transceiver, but may still be able to communicate with a cellular communication network via an external unit that provides cellular communication connectivity; for example, Client Device 602 may be a laptop/desktop computer, that by itself may lack any cellular transceiver, but that may be connected to an external cellular transceiver which provides cellular communication connectivity to such computer, or may utilize a cable/wire for tethering with a nearby device (e.g., smartphone, tablet) that has a cellular transceiver which provides cellular communication connectivity to such computer, or may utilize a wireless communication link (e.g., over Bluetooth®, over Zigbee®, over Wi-Fi, or the like) for connecting to a nearby device (e.g., smartphone, tablet) that has a cellular transceiver which provides cellular communication connectivity to such computer.

In some embodiments, Server 603 may be capable of directly communicating (usually using IP packets) with one or more cellular communication networks; for example, as Server 603 may be configured or augmented to include a cellular transmitter/receiver/transceiver/modem, such as a 5G/4G/3G transceiver, or future versions (e.g., 6G) of cellular transceiver(s). In other embodiments, Server 603 may not integrally comprise a cellular transceiver, but may still be able to communicate with a cellular communication network via an external unit that provides cellular communication connectivity; for example, Server 603 may be a server computer or a server apparatus, that by itself may lack any cellular transceiver, but that may be connected to an external a cellular transceiver which provides cellular communication connectivity to such server computer, or may utilize a cable/wire for tethering with a nearby device (e.g., smartphone, tablet) that has a cellular transceiver which provides cellular IP communication connectivity to such server computer, or may utilize a wireless communication link (e.g., over Bluetooth®, over Zigbee®, over Wi-Fi, or the like) for connecting to a nearby device (e.g., smartphone, tablet) that has a cellular transceiver which provides cellular communication connectivity to such computer; or may utilize other type of Mobile/Cellular Access Unit 604 (such as, for example, a LiveU Xtender unit), over a wired communication link (e.g., an Ethernet cable, a fiber optic cable, an optical fiber cable, a USB cable, a Thunderbolt cable, or the like) and/or a wireless communication link, to obtain cellular communication capability or IP connectivity.

Client Device 602 may connect to, and may communicate with or via, one or more cellular communication networks; for example, Cellular Network 601D (which may have or may utilize a Port-Restricted NAT), Cellular Network 601E (which may have or may utilize Symmetric NAT), Cellular Network 601F (which may have or may utilize a Port-Restricted NAT), or the like. Each such cellular network may communicate with the Internet 612 (or other global/public-access communication network)

Similarly, Server 603—directly or via its associated Mobile/Cellular Access Unit 604—may connect to, and may communicate with or via, one or more cellular communication networks; for example, Cellular Network 601A (which may have or may utilize Symmetric NAT), Cellular Network 601B (which may have or may utilize Port-Restricted NAT), Cellular Network 601C (which may have or may utilize Symmetric NAT), or the like. Any other combination of modems, transceivers, networks, operators and their respective NAT(s) or similar routing entities are also included in the solutions provided by some embodiments of the present invention.

It is noted that in some embodiments, Server 603 may concurrently or simultaneously be connected to, or be in active communication with, two or more cellular communication networks; for example, as the Mobile/Cellular Access Unit 604 may comprise two or more SIM cards or eSIMs or Virtual SIMs or IMSIs or keys or other credentials or simply other mobile networks/cellular networks. For example, cellular network A (e.g., a 5G cellular network by operator OP-1) and a cellular network B (e.g., a 5G or 4G or other type of cellular network by operator OP-2 or by any operator including operator OP-1); or, cellular network A and Wi-Fi network C; or cellular network A and Satellite communication network/SATCOM network D; or cellular network A and cellular network B and also Satellite communication network/SATCOM network D; or a combination of one or more cellular networks and one or more Wi-Fi networks and one or more Satellite communication networks; or any other combination with any number or types of communication networks, connections/links, modems, transceivers, Radio Access Technologies (RAT), operators, credentials, and/or network elements.

In some embodiments, optionally, system 600 and/or server 603 and/or Mobile/Cellular Access Unit 604 and/or client device 602, and/or other components or embodiments of the present invention, may utilize, or may comprise, or may operate in conjunction with, one or more devices or systems or methods that are described in U.S. Pat. No. 7,948,933, which is hereby incorporated by reference in its entirety; and/or in U.S. Pat. No. 9,369,921, which is hereby incorporated by reference in its entirety; and/or in U.S. Pat. No. 10,206,143, which is hereby incorporated by reference; and/or in U.S. Pat. No. 9,712,267, which is hereby incorporated by reference; and/or in U.S. Pat. No. 9,154,247, which is hereby incorporated by reference; and/or with other suitable mechanisms or components for utilization of two or more cellular communication links or two or more other communication links (of the same type, or of different types; of the same communication provider/network, or of different/multiple communication providers or communication networks) in concert or simultaneously or concurrently; and by utilizing equitable or non-equitable allocation of packets, that are intended for transmission to one or more remote devices, across two or more cellular transceivers and/or wireless transceivers and/or wired transceivers, and/or optionally utilizing a pre-defined or a dynamically-defined scheme for bonding and/or multiplexing of such two or more communication links or communication connections. Such multi-modem or multi-link or multi-network communication may be implemented by, for example, bonding of communication links or communication channels, and/or by splitting or dividing or allocating or assigning all or part of the traffic (e.g., the packets that are intended for transport/transmission) in any suitable way (e.g., in accordance with a pre-defined or dynamic or both packet allocation scheme or rules, across multiple links/modems/transceivers; in accordance with an inequitable allocation scheme; by taking into account current/momentary/recent/past/estimated performance of each available link/modem/transceiver; or the like) over one or more of the associated links or modems or transceivers, to be communicated or transported or transmitted simultaneously or near simultaneously or at least partially in a concurrent manner, or via switching all or part of the traffic from one link/modem/transceiver to another upon any decision or if one or more conditions hold true, or by offloading all or part of the traffic from one link/modem/transceiver to another at any point in time and based on one or more conditions or rules or traffic allocation schemes, or changing from one such method to another based on dynamic evaluation of current/past/estimated performance characteristics or conditions, and/or by using any other suitable way of communicating or sending packets over two or more communication links/modems/transceivers.

In accordance with embodiments of the present invention, Server 603 connects to a VPN Server 611, such as an L2TP VPN (or other type of VPN), which may utilize a Full-Cone NAT; and only via that VPN Server 611, the Server 603 communicates with the Internet 612 (or other global/public-access communication network). A STUN server 613 is also a part of system 600.

For demonstrative purposes, FIG. 6 shows cellular communication networks/links; however, some embodiments of the present invention may similarly operate, and may similarly penetrate/puncture all types of NAT services, if one or more of the links, or most of the links, or all of the links, are other type(s) of communication links; such as Wi-Fi communication links, wireless communication links, wired communication links, satellite communications (SATCOM), or the like; and some embodiments may similarly operate, and may effectively provide NAT puncturing/penetrating, for a device that is connected to a private or a public Internet wireless access point or Internet wired access point or Wi-Fi access point or Wi-Fi router or wired router or wired communication switch; particularly if such access point or router is run by a third-party (e.g., the Client Device is using a Wi-Fi access point of a hotel or an airport or a public library or a coffeeshop), and/or particularly when the user of such Client Device does not have administrator-level access to a local Firewall/Router/Access Point/NAT unit and thus cannot manually configure port-forwarding rules.

In relation to the demonstrative configuration of system 600, the following table, denoted Table 2, shows which NAT-penetrating/NAT-puncturing connections can be (or, cannot be) established by using only a STUN method, and without using also the VPN Server 613:

TABLE 2

| Link | Is the Connection Possible with only STUN and without using the VPN Server? |
|---|---|
| 601A → 601D | No |
| 601A → 601E | No |
| 601A → 601F | No |
| 601B → 601D | Yes |
| 601B → 601E | No |
| 601B → 601F | Yes |
| 601C → 601D | No |
| 601C → 601E | No |
| 601C → 601F | No |

It can be seen that in the above scenario, only 2 out of 9 (approximately 22 percent in this specific and non-limiting example) of the possible connections, from networks 601A/ 601B/601C to network 601D/601E/601F, would work using only the STUN method and without utilizing the VPN Server 611 and its innovative solution. In contrast, utilization of the VPN Server 611 in accordance with embodiments of the present invention, would enable all 9 out of 9 (entire 100 percent) of the possible connections, from networks 601A/601B/601C to network 601D/601E/601F, to work.

In accordance with some embodiments, upon start-up, Server 603 creates a separate VPN connection for each one of its communication links, or for each static or dynamically-determined or dynamically-modified subset of communication links. Accordingly, each of the VPN-enabled cellular communication link(s) that is utilized by Server 603, will be provided its own private IP address within the VPN Server's (611) virtual private network, and will have access to the public Internet through the VPN server's (full-cone) NAT.

For each communication link (which may be a singular communication link; or which may be part of a bonded multiple-links communication link) that Server 603 and Client Device 602 attempt to create, the server-side NAT will always be a full-cone NAT, regardless of the identity or configuration parameters of the cellular network that is being used. Based on the above (Table 1), with a Full-Cone NAT, a connection is possible with any client-side type of NAT, including even Symmetric NAT.

In conventional systems that utilize a TURN server, only a single connection is made from the application server to the TURN server; and the TURN headers that the TURN server adds, allow the application to know which client device had sent the data. If an application works with multiple connections/sockets, it would need to be drastically modified in order to attempt to support the TURN scenario.

In contrast, the innovative VPN-based solution of embodiments of the present invention, does not require any modification to the application itself or its code or its program libraries or its dependencies; and does not require to add or to deploy any TURN (or similar protocol) support library or code, or any TURN header generator modules and/or TURN header parsing modules; and thus also reduces CPU cycles or processing resources, as well as memory resources, as the solution of embodiments of the present invention can be implemented at the kernel level (e.g., as part of an Operating System, or as driver or extension or plug-in or add-on to the Operating System), in an application agnostic manner, which is more efficient and removes the reliance on TURN server and TURN headers that are sent and received; and (in at least some implementations or scenarios) may also reduce the overall size of traffic that is being sent/received/used (e.g., measured in bytes), as such TURN headers need not be sent/received/used, and particularly when the VPN protocol header is smaller/shorter than the TURN header.

Once the Server 603 has ensured that each of its relevant/ utilized/selected/associated cellular communication links has its own VPN connection (and thus, its own IP address and port) towards the VPN Server 611, system 600 can use the STUN-based (and not the TURN-based) NAT puncturing/penetration technique described above; and now, as far as the client device is concerned, the Server 603 is located behind a Full-Cone NAT (due to the VPNs between Server 603 and VPN Server 611), and therefore, the STUN-based NAT puncturing/penetration technique will work, regardless of the type of NAT that is the server-side NAT (in networks 601A/601B/601C) and regardless of the type of NAT that is the client-side NAT (in networks 601D/601E/601F); and the block of "Server-Side NAT" can be replaced with "VPN's NAT").

Figure 7A:
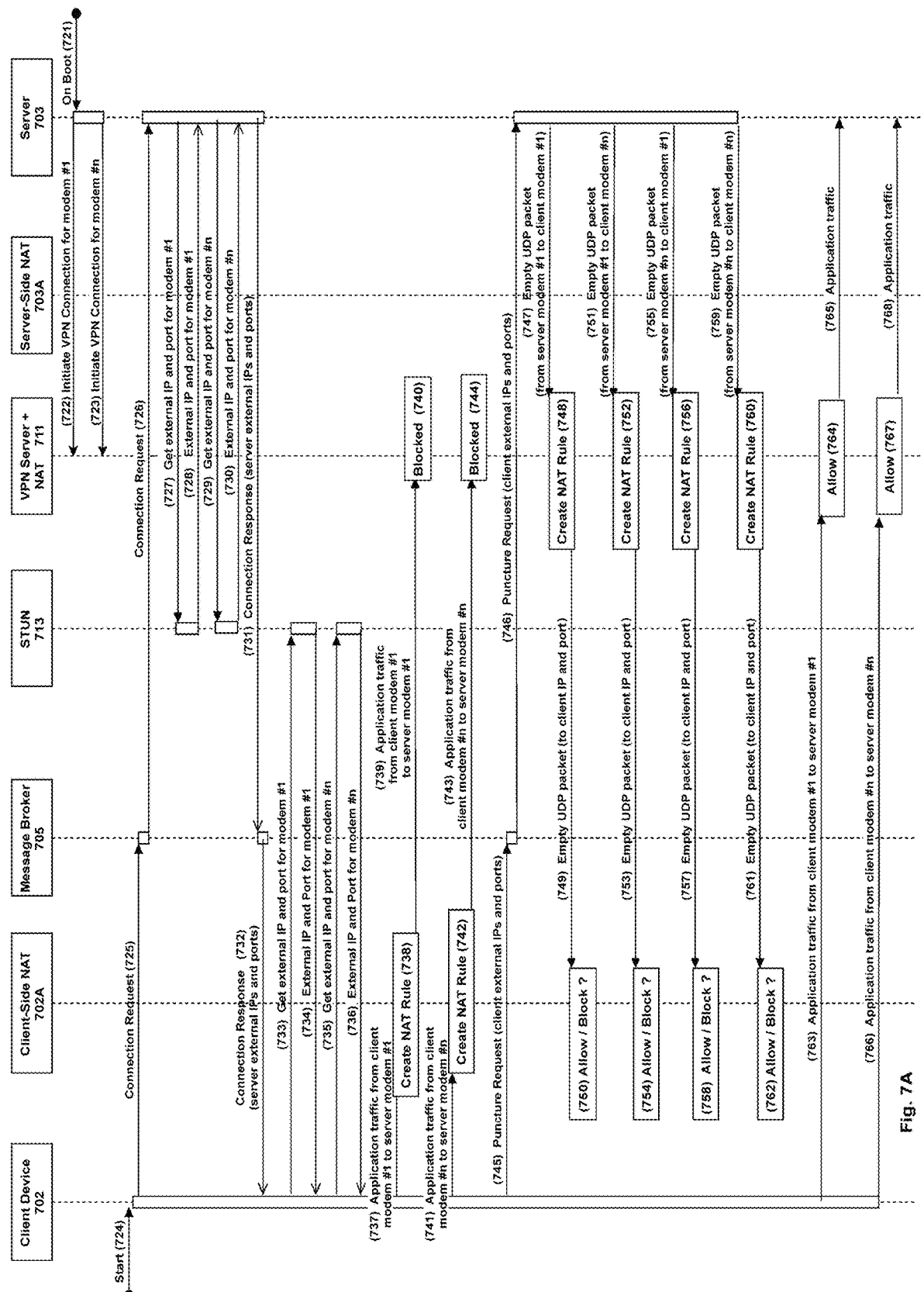
Figure 7B:
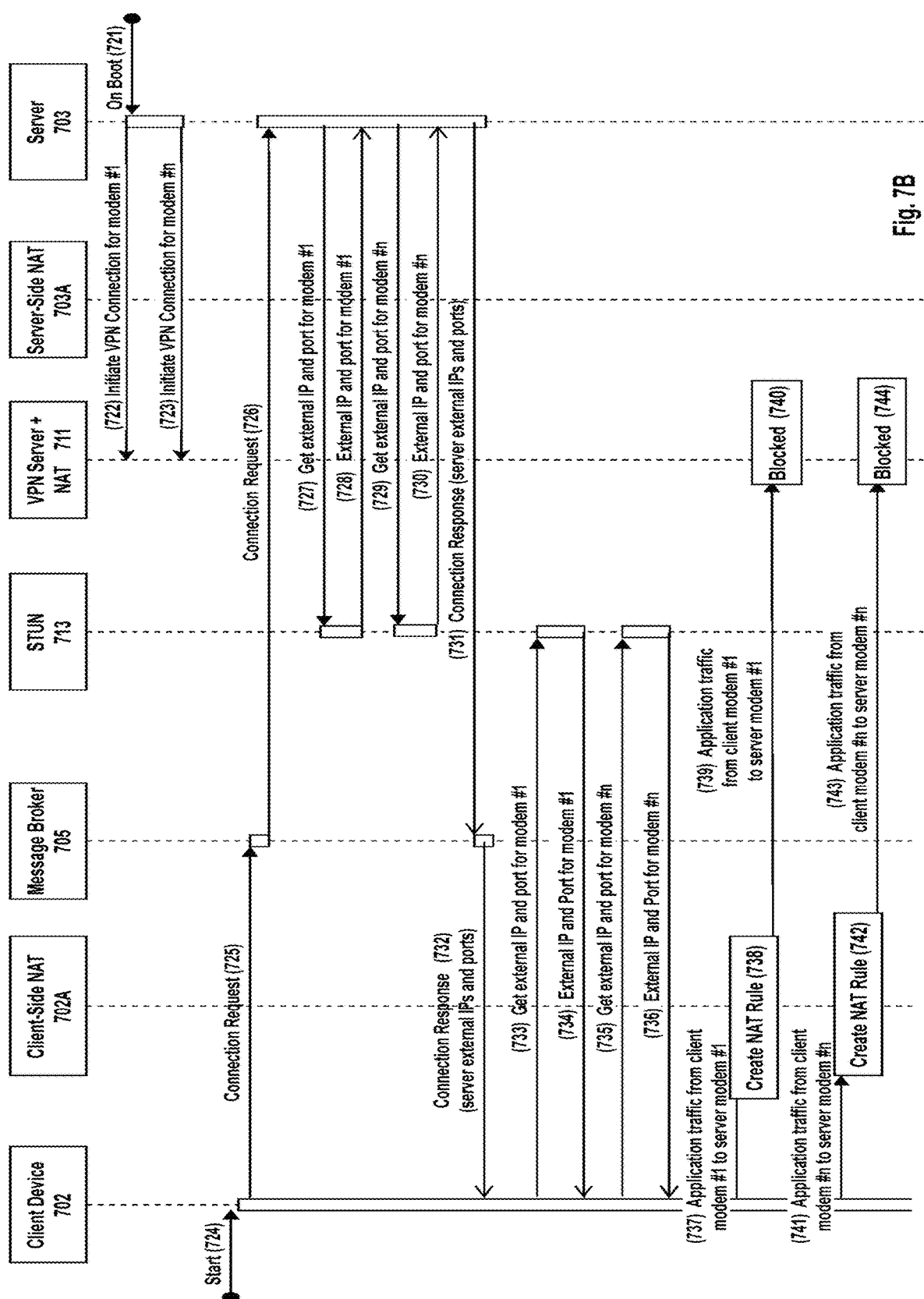
Figure 7C:
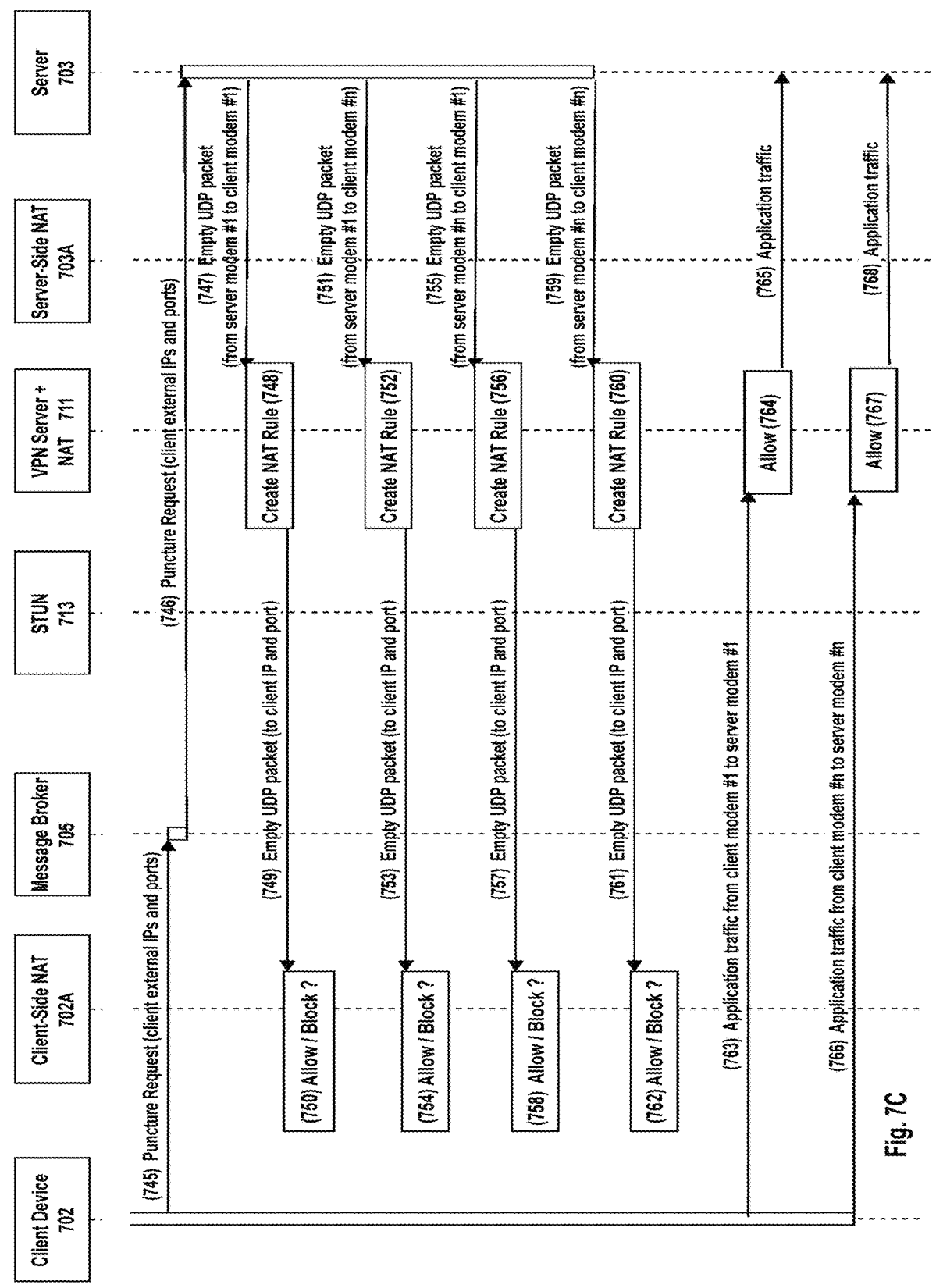

Reference is made to FIG. 7A, which is a chart of operations demonstrating TURN-less NAT puncturing/penetration, in accordance with some demonstrative embodiments of the present invention. Reference is also made to FIG. 7B, which is an enlarged version of the top-half of FIG. 7A; and to FIG. 7C, which is an enlarged version of the bottom-half of FIG. 7A; which are presented in order to show their components and their text in larger fonts for easier reading.

Client Device 702 of FIG. 7A may correspond to Client Device 602 of FIG. 6; and may be associated with Client-Side NAT 702A. Similarly, Server 703 of FIG. 7 may correspond to Server 603 of FIG. 6; and may be associated with Server-Side NAT 703A.

VPN Server 711 of FIG. 7A may correspond to VPN Server 611 of FIG. 6.

STUN server 713 of FIG. 7A may correspond to STUN server 613 of FIG. 6.

Further shown in FIG. 7A is a Message Broker unit 705; it may be implemented as a router, an access point, a publicly-available server, or other network element. Examples of such 705 Message Broker are: RabbitMQ®, or MQTT, or a proprietary message broker, or others.

As demonstrated, on boot (721), Server 703 initiates (722) a VPN connection for modem #1; and similarly, initiates (723) VPN connections to further modems up to modem #n. Those VPN initiation requests are sent from Server 703 to VPN Server+NAT 711.

Client Device 702, upon start (724), sends (725) to Message Broker a connection request. Message Broker 703 sends (726) the connection request to Server 703. Server 703 sends to STUN Server 713 a request (727) to get the external IP address and port for modem #1; and STUN Server 713 sends back (728) to Server 703 a response indicating the external IP address and port for modem #1. Similarly, Server 703 sends (729) to STUN server 713 requests to get the external IP addresses and ports of other modems up to modem #n; and similarly, STUN server 713 sends back (730) to Server 703 those external IP addresses and ports of other modems up to modem #n. Server 703 then sends (731) to Message Broker 703 a connection response indicating those external IP addresses and ports of Server 703; and Message Broker 703 sends (732) that connection response to Client Device 702.

Client Device 702 sends (733) to STUN Server 713 a request to get the external IP address and port for its modem #1; and in response, STUN server 713 sends back (734) to Client Device 702 the external IP address and port of modem #1. Similarly, Client Device 702 sends (735) to STUN Server 713 requests to get the external IP addresses and ports for its modems up to modem #n; and similarly, STUN server 713 sends back (736) to Client Device 702 the external IP addresses and ports of those other modems up to modem #n.

Application traffic is sent (737) from modem #1 of Client Device 702 to modem #1 of Server 703; the Client-Side NAT 702A creates a NAT rule (738), and the application traffic from client's modem #1 proceeds (739) towards the server's modem #1 and is blocked (740) at the server-side NAT which is a part of the VPN Server+NAT 711.

Similarly, application traffic is sent (741) from modem #n of Client Device 702 to modem #n of Server 703; the Client-Side NAT 702A creates a NAT rule (742), and the application traffic from client's modem #n proceeds (743)

towards the server's modem #n and is blocked (744) at the server-side NAT which is a part of the VPN Server+NAT 711.

Client Device 702 sends (745) to Message Broker 705 a puncture request, indicating the external IP addresses and ports of the modems of Client Device 702. Message Broker 705 sends (746) that puncture request to Server 703, indicating those external IP addresses and ports of the modems of Client Device 702.

Server 703 sends (747) an empty UDP packet, from the server's modem #1 to the client device's modem #1, through the server-side VPN Server+NAT 711; which creates a NAT rule (748); and the empty UDP packet proceeds (749) towards Client Device 702, with Client-Side NAT 702A deciding whether to allow or to block (750).

Similarly, Server 703 sends (751) an empty UDP packet, from the server's modem #1 to the next modem of Client Device 702, up to modem #n of Client Device 702; a NAT rule is created (752) at the server-side VPN Server+NAT 711; and the empty UDP packet proceeds (753) towards Client Device 702, with Client-Side NAT 702A deciding whether to allow or to block (754).

As indicated, this is repeated (steps 755 to 758) by sending an empty UDP packet from the next modem of Server 703 (up to modem #n of Server 703) to the modem #1 of Client Device 702; and similarly, this is repeated (steps 759 to 762) by sending an empty packet from modem #n of Server 703 to modem #m of Client Device 702.

From here and onward, application traffic is sent (763) from modem #1 of Client Device 702 towards modem #1 of Server 703; the server-side NAT allows (764), and the traffic arrives (765) to modem #1 of Server 703.

Similarly, application traffic is sent (767) from modem #n of Client Device 702 towards modem #n of Server 703; the server-side NAT allows (767), and the traffic arrives (768) to modem #n of Server 703.

In accordance with some embodiments, the component that manages the VPN Client (running on Server 703) detects that a connection is dropped based on suitable notifications; and Server 703 will notify the VPN component running on the Client Device 702 of such connection drop, to ensure that the Client Device 702 would stop attempting to use that already-dropped connection or communication link. A new VPN connection will then be established between the two sides of the VPN. Once the VPN connection is established, the VPN component on Server 703 will again gather its public IP address and port information from the STUN Server 713, and would relay that information to the Client Device 702 so that the new communication link between them can be used. In case of using (e.g., concurrently, in parallel, in concert, as a bonded communication channel) multiple communication links/modems/transceivers by Device 702, in some embodiments, this drop of VPN connection might occur only on some of the links/connections/combination of networks, and not necessarily on all others. Therefore, the communication between the two sides will continue to be maintained and to be operational and/or uninterrupted over the non-affected communication links, while the new VPN connection is established for the communication links that need it. Once this is completed, which may take few milliseconds or seconds or minutes (if the VPN dropping was due to a temporary short-time problem) or may take hours or even days (if the VPN dropping was due to a more complicated VPN infrastructure problem), the re-established VPN link(s) may be added by the two sides to their multi-link communications, transparently to the application itself.

In FIG. 7A, the device that is expecting to be the first of the two that receives the first IP application traffic packets, is the one (and sufficiently it is the only one) that connects to and utilizes the VPN server. This is not necessarily the device that is behind the Symmetric NAT. For example, device 702 may be a field transceiver that transmits video packets over one or more cellular modems that use one or more cellular networks, which are often utilizing Symmetric NAT(s); whereas device 703 may be the video receiver which resides behind port forwarding connected via a LAN. Still, this server 703 will be the one connecting to the VPN server because (a) it serves many clients/field devices, such as device, 702 so it would be more useful or more efficient that server 703 would be the side that connects to the VPN server; and/or (b) server 703 is (in some scenarios) the first device out of the two sides that is expecting IP traffic packets, as usually device 702 will start sending video or other packets and only then the server 703 will respond, as is the commonly accepted practices in client-server communications. Still, in another example, device 703 itself could also be placed/residing/deployed in the field, and may use one or more cellular modems for bonded communication over one or more cellular networks with client devices like device 702, instead of using LAN. In this case too, device 703 will be the one connecting with the VPN server, for the same reasons mentioned above or for similar reasons. The method described above or herein will still work and puncture/penetrate all NATs of all networks that device 702 and device 703 may be using. Further in FIG. 7A, the IP packets sent in steps 749, 753, 757 and 761 are referred to as "Empty UDP packets". They are used to puncture and penetrate the symmetric NAT, by using—as destination IP addresses—the addresses that their respective sending devices received from the Message Broker after the VPN was contacted by device 703. These "puncturing packets" may also not be "empty", or may optionally contain a small payload or a small-sized content (e.g., a few bytes). In FIG. 7A, the IP packets of the actual application traffic that needs to be communicated between devices 702 and 703 is being transmitted after these puncturing stages have ended, such as at steps 763-768. After step 765, device 703 will send the application IP traffic packets back to device 702 by setting their IP destination address to the address received from the application IP traffic of device 702 in step 765, instead of the address it used in the previous steps as destination addresses which, as explained above, is the address received via the Message Broker. The application IP traffic address is the one that should be used for the rest of the communication. Device 702 may also use for IP destination of application traffic packets, that it sends to device 703, the source IP address from the application packets incoming to device 702 from device 703, but it does not have to; and it may still use as destination the address that it received from the Message Broker for device 703. If device 703 too is behind a Symmetric NAT, then device 702 would use, for application traffic destination address for packets transmitted to device 703, the IP source addresses that appear in the IP application traffic packets incoming into device 702 from device 703 after the previous puncturing phases.

In some embodiments, in FIG. 7A, it is not necessary that the first device (such as device 703, which may be referred to as a "server" device) that runs the application that expects to receive the application packets, will be the one connecting to the VPN service. It may be the device that runs the application that sends the first packets, and it does not necessarily wait for incoming packets to arrive at it firstly (namely, it can be device 702, such as a field transmitter in this example, which may be referred to as a "client" device). In this case, the first application packets sent to device 703 might be blocked by a yet-unpunctured NAT, but then mechanisms such as retransmissions for which packet losses is not important, or a utility or software process that is run by said first or second device that sends application level packets which are of no importance if missed, can be deployed at this stage until the "real" (namely, the meaningful) application packets sent from device 702 to device 703 arrive and returned. In some embodiments, a retransmission unit may retransmit such initial packets, which firstly do not arrive since the NAT was not yet punctured, and later are retransmitted and arrive after the NAT was punctured.

In some embodiments, L2TP can be used as the VPN protocol; since it fits well with the network traffic itself, being implemented in UDP with a small header (e.g., small overhead, encapsulating protocol bytes). In some embodiments, IPSec encryption can be used in addition to L2TP; for example, if the application traffic itself is generated firstly as non-encrypted data. In other embodiments, IPSec encryption can be avoided; such as, if the application traffic itself is already encrypted; and this may reduce processing resources and processing overhead when dealing with the VPN.

In other embodiments, other suitable VPN protocols may be used, instead of L2TP or in addition to L2TP. In some embodiments, multiple VPNs, same or different ones, may be used by the devices. The decision regarding which VPN protocol to use for each particular communication connection, can be based on the type of traffic that is expected to be sent over that particular connection. For example, L2TP may be suitable for UDP streaming protocols; whereas other types of data may benefit from a TCP-based VPN connection such as PPTP or OpenVPN®.

In some embodiments, a VPN Protocol Selection Unit may operate to determine which VPN protocol or even which VPN operator to utilize for each communication link or for each communication connection at each point in time. It may take into account one or more parameters or data-items, such as: static or dynamic blacklisting or whitelisting of particular VPN operators and/or VPN protocols, the expected or estimated or typical overhead of the VPN protocol in terms of bytes, processing power, memory requirements; the type of traffic or packets; frequency and/or the byte-size of the traffic (e.g., implementing a possible rule that larger and/or more frequent packets would often be better served by using a VPN protocol or VPN service or operator that has smaller overhead of VPN protocol bytes); the security level needed for the traffic; the localization of the Server 703; the localization of the VPN Server 711; the localization of the Client Device 702; the particular identity of the cellular network that are actually involved (e.g., based on pre-defined rules that can indicate, for example, that a 5G cellular network from Provider P1 typically operates better with VPN protocol 1, whereas, a 4G-LTE cellular network from Provider P2 typically operates better with VPN protocol 2; such as, based on analysis of historic performance data that can be collected and analyzed), date or time, traffic volume or volume versus threshold (e.g., the number of communicated bytes above a certain threshold, or a ratio which then causes a different cost to be charged by the VPN operator), communication link performance and/or cost, and/or any other selection parameter or criteria; optionally based on a rule that requires, or that prefers, two or more different VPN protocols for two or more communication links (e.g., for redundancy purposes; or for the purpose of measuring, over time, which VPN protocol or VPN operator performed better, and for later implementing analysis results); based on the licensing requirements of each VPN protocol (e.g., open source; closed source; free license; paid license; proprietary license); based on whether the packets or traffic are already encrypted, or still require a first-ever encryption, or require a second encryption layer for increased security; data indicating reliability/latency/Quality of Service (QoS)/Quality of Experience (QoE) that can be measured when using a particular VPN protocol; data or rules that indicate that a first application (or application-type) performs better with VPN protocol 1, whereas a second application (or application-type) performs better with VPN protocol 2; data or rules that indicate that a first cellular transceiver (or type, or generation, or model, or maker, or make-and-model thereof) performs better with VPN protocol 1, whereas a second, different, cellular transceiver (or type, or generation, or model, or maker, or make-and-model thereof) performs better with VPN protocol 2; and/or other suitable data or parameters or selection rules.

In case of using multiple VPNs, each of the applications that run on the device and need NAT puncturing for symmetric NATs and/or non-symmetric NATs, may use a certain VPN protocol and/or VPN server in order to communicate with a certain second node for a certain traffic type or protocol type (e.g., UDP vs. TCP) or packet type or packet size or other differentiated traffic type or cost-related parameter or desired communications performance. This may be decided or determined by the application itself, or by a remote monitoring and/or decision-making component or unit or server, or by the VPN manager module running on the device, or by the Operating System (OS) or a similar component. This VPN is not aware of which application is using it, as it is decoupled from the application(s) via the Operating System communication services, APIs, drivers and calls. In accordance with embodiments of the present invention, the application that requires or requests NAT puncturing, of a type that cannot be punctured without additional/other protocols such as TURN and/or for a NAT that cannot be punctured without such additional protocol (s), will communicate with the other node or device via the standard non-specific OS and/or drivers and/or APIs and/or the (software based) communication function calls that route the traffic via the VPN service, without implementing a TURN or similar specially included and invoked function calls and handshake protocols. Then, a decision-making component may decide for that same application (and/or for other application(s) running on the same device) to use another VPN protocol and/or server or VPN operator in order to communicate with the same second node but for another traffic or other types of data streams. It may further decide to use the same or yet a different VPN protocol and/or VPN server or VPN operator to communicate with a third other node for the same or different traffic or data stream types or specific ones. In this way, the single or multiple applications may be using multiple different or same VPNs for the NAT puncturing, each of these VPNs being handled, opened, managed and maintained transparently to the application via the device's OS or other communication management component.

In some embodiments, the device's VPN client may be configured so that when it identifies a certain drop of the remote VPN server or a slow down or other degradation when using that VPN, or the communications with it, it may decide to switch to another VPN server for the NAT puncturing. It may then either communicate this to the other device (second client device, or server) with which it wants to communicate; or, that other device (second client device, or server) may be configured in a similar way so that it will also switch to the second VPN server. This is done transparently to the traffic and the application(s), such that communication continues without integrating any code or configuration to be made by the application, and still no TURN or similar protocols are needed. Hence, further reliability and redundancy is added, without any impact on the application or its code or code development.

Optionally, a software block or logic unit or other component may be added or used, for deciding or selecting which VPN server and/or VPN protocol to use; and it may take into account one or more, or some, or most, or all, of the above-mentioned data or rules or criteria, and/or other data or rules or selection criteria or pre-defined conditions. In such case, the application(s) would not need to perform such selection/mitigation/switching operations or decisions.

Such additional block or component may optionally be implemented in the kernel space or the user space, or as part of the Operating System, or as a driver, or as a stand-alone or add-on or plug-in component or software module. The two sides, or two clients/devices for each application, may be coordinated via the VPN server or another server, by registering to them, authenticating them, and getting from them the correct data of VPN server and VPN protocol for that communication session.

Alternatively, in this case of coordination not by the application but by a managing block or component, the coordination of the selection of the VPN server and/or VPN protocol may be done directly between the two VPN sides; for example, by an additional phase in the algorithm where both sides initially use multiple VPN servers and/or VPN protocols (e.g., concurrently, in parallel), until a match is found between the two sides as the VPNs being used each indeed achieve puncturing/penetration of the other side's NAT and hence enable the two sides to finalize this selection process based on the particular combination that is observed to be successful.

In other embodiments, the selection or decision process of which VPN protocol and/or VPN server to use, may be done by firstly using an agreed upon or a pre-configured VPN server and/or VPN protocol (similarly to an agreed upon, default DNS servers, such as those provided by Google® or other major companies). Once the NAT is indeed punctured or penetrated or traversed using this default VPN service/server/protocol, the two sides may communicate between them and decide on the secondary, non-default, VPN server and/or VPN protocol that will be actually utilized for their application(s) NAT puncturing purposes from that point onward, and may switch to that mutually-selected VPN server and/or VPN protocol. In some embodiments, applications or devices that use multiple different networks or network operators or modems or links, may further use different VPN servers and/or VPN protocols for each such communication link and/or for each such network; such as, for redundancy purposes or for other purposes; and in such case, the VPN server for communicating between two modems or transceivers that are currently operating on the same network (such as, the same 5G cellular network from the same cellular operator) may use a VPN server provided by that same network or network operator, in the network or externally to it, or an external VPN server by another network and/or network operator which is more appropriate, less costly (in any of variety of criteria) to that network. Using multiple VPN servers and/or multiple VPN protocols in such configuration of multiple modems/transceivers/links that are used in parallel or concurrently or in concert, may provide an additional level of redundancy and/or reliability, and even an additional level of security: for example, VPN server 1 has a security breach that is unknown to the general public or to its owner; while VPN server 2 does not have any security breach; and thus, allocating traffic across two transceivers/modems, that are associated with two different VPN servers, causes at least some of the traffic to remain unbreached or un-compromised; or in another example, VPN protocol 1 has a zero-day security vulnerability that is unknown to the general public or to its owner or that was not yet patched; while VPN protocol 2 does not have that zero-day security vulnerability; and thus, allocating traffic across two transceivers/modems, that are associated with two different VPN protocols, causes at least some of the traffic to remain un-breached or un-compromised.

In such cases of multiple modems/transceivers, the VPN management block or component may try each modem/transceiver/link/connection/network with a different VPN server and/or VPN protocol, and then may decide which one to use by the other links in case those that were tried by these other links failed. The OS and/or middleware block and/or specific applications or devices, may be configured (e.g., from or by a remote server or control unit, or by an internal configuration unit) with regard to which VPN server and/or VPN protocol to use, or to switch to; optionally with an ordered list or prioritized list of "fallback" VPN servers/VPN protocols. Such remote (or local) configuration, including remotely over the air, allows for easy "roaming" of the device or devices, efficient deployment without knowing in advance which country or location it is destined to, changing commercial agreements with VPN providers on the fly, or other benefits. It may also allow automatic fault recovery and mitigation in case of VPN servers or communication faults, cyber-attacks (such as D-DOS) on them, communications congestion, or the like. Accordingly, some embodiments make such recovery and mitigation be a process that is transparent to the application/s that need the NAT puncturing.

Some embodiments of the present invention thus virtualize NAT puncturing, either and both for symmetric or for non-symmetric NATs, for the applications needing it. The applications may even be a Docker container, NETAPP or similar packaged or deployed and/or package-less-deployed ported to various other servers and/or Operating Systems (OSs), other geo-locations where a different VPN server may be advisable or mandatory (e.g., by law or regulations), and/or in "closed gardens" or "on premise" or "private networks". The virtualization provided by some embodiments may simplify significantly NAT puncturing for symmetric and non-symmetric NATs for mobile devices or applications, as well as more static or fixed applications or devices or non-portable devices or non-mobile devices, and for their deployment, operations and maintenance.

In some embodiments, each communication link that is utilized in a bonded/aggregated communication channel, may utilize its own, separate, VPN server and/or VPN provider and/or VPN protocol.

In some embodiments, each bonded/aggregated communication channel, may utilize its own, separate, VPN server and/or VPN provider and/or VPN protocol.

In some embodiments, multiple communication links are utilized in a bonded/aggregated communication channel; and at least one or more of those communication links are configured to utilize VPN server 1 and/or VPN provider 1 and/or VPN protocol 1; whereas, in that same bonded/aggregated communication channel of that same UE device, in parallel, at least one or more other communication links are configured to utilize VPN server 2 and/or VPN provider 2 and/or VPN protocol 2.

In some embodiments, optionally, a VPN Configuration/Switching/Assigning/Monitoring Module may be part of the UE device, and may be responsible for selecting and/or assigning a particular VPN server/provider/protocol for a particular communication link; for monitoring the performance of each such VPN server/provider/protocol, over time and/or momentarily; to determine and to trigger switching from one VPN server/provider/protocol to another; to detect a drop or a problem in a particular CPN server/provider/protocol and to trigger switching to another server/provider/protocol, temporarily or long-term; and/or for configuring or modifying other VPN-related parameters or settings; and/or for dynamically changing the allocation of a particular VPN server/provider/protocol to a particular communication link/modem/transceiver.

Some embodiments may provide one or more of these benefits: (1) The capability to achieve NAT puncturing/penetration, in virtually all scenarios and configurations, regardless of the networks that the client device and/or the server device are connected to, regardless of the type of NAT(s) that are on the server-side and/or the client-side and/or along the communication route, and without deploying/integrating/requiring/utilizing/adding/relying upon any TURN server or TURN headers. (2) Requires no modification of the application/s that need NAT puncturing/penetration, or of their core business logic. (3) In contrast to a "custom proxy" configuration, some embodiments may be implemented by utilizing standard building blocks without the need to develop or to deploy a proprietary application. (4) Some embodiments may utilize open-source and/or free solutions for VPN clients, although any suitable VPN package can be used. (5) The encapsulation of the application traffic with the L2TP protocol can be performed entirely within the Linux kernel, further reducing the overhead, and obviating the need to write application-level code or modifications. (6) The NAT implementation is also done in the kernel, allowing very high network traffic rates while consuming little CPU usage (e.g., approximately 1 or 2 percent of CPU load for transporting traffic at a rate of 100 Megabit-per-second), thereby reducing the need to use many VPN servers in order to allow a wide deployment; in contrast, a TURN server is a user-mode application that requires copying the network traffic from user-mode to kernel (twice), further increasing CPU usage and processing resources requirements, as well as memory load of the machine. (7) The client side is left virtually unmodified, so there are no additional overheads, additional or augmented CPU requirements, additional or augmented memory requirements, or additional resources requirements.

In some embodiments, optionally, in order to save costs which may sometimes be associated with the utilization of a VPN server, and/or in order to reduce latency which may sometimes be caused by a VPN server, and/or in order to increase the overall bandwidth that each communication link can effectively and efficiently utilize, a Selective Switching/Modification Unit may be implemented. For example, some embodiments may utilize a NAT Type Detection Unit, to detect or to determine which type of NAT is on the client side and/or which type of NAT is on the server side; and then, if it is determined that at least one of those NATs is not Symmetric NAT, then the Selective Switching/Modification Unit may determine that some, or most, or all of the traffic does not require to be transported via the VPN solution; but rather, some (or most, or all) of the traffic can be transported with STUN-based NAT puncturing which may suffice. For example, some embodiments may utilize a mechanism which may be similar to Interactive Connectivity Establishment (ICE), or other technique to find ways for two devices to communicate with each other directly (or, as directly as possible), where the NAT type is also relayed between the server and client, so that if the system detects that a certain pair of cellular connections may work properly without the VPN server (e.g., neither of the two connections is behind Symmetric NAT), the system automatically or dynamically or autonomously switches to de-activating the VPN solution and instead utilizes the STUN-based NAT puncturing between the two devices directly instead of through the VPN server. In some embodiments, the Selective Switching/Modification Unit may check, initially upon commencement of a communication session, and/or periodically (e.g., every 60 seconds, every T seconds or minutes) whether STUN-based NAT puncturing can suffice, or whether the VPN-based solution is still mandatory; and may switch from the VPN-based solution to the no-VPN and STUN-based NAT puncturing is the determination result is positive. In some embodiments, the checking may be performed if one or more conditions hold true; for example, if communication latency/delay is greater than a pre-defined threshold value; if current or momentary or recent or bandwidth/throughput/good-put is smaller than a pre-defined threshold value; or the like.

Some embodiments provide a method for enabling network communication between electronic devices across network address translation (NAT) services or systems, including such that were un-penetrable or impenetrable up to now without a designated protocol such as TURN, the method comprising: establishing a virtual private network (VPN) connection between a first device and a VPN server, wherein the VPN connection employs a NAT that facilitates mapping of network addresses, and wherein such establishing is done in a manner that supports direct communication across various types of NAT configurations without relying on Traversal Using Relays around NAT (TURN) protocols; utilizing a session traversal utilities for NAT (STUN) protocol or equivalent to determine external network addresses for at least one of the first computing device and a second computing device seeking communication through the VPN connection; configuring dynamic NAT puncturing rules associated with the determined external network addresses to enable direct network communication between the first computing device and the second computing device across the VPN connection, wherein the dynamic NAT puncturing method is applicable to various types of NAT systems including symmetric NAT, port-restricted NAT, and address-restricted NAT among others.

In some embodiments, the VPN connection is established using a Layer 2 Tunnelling Protocol (L2TP), by itself or together with Internet Protocol Security (IPsec). In some embodiments, the first device and the second device include devices selected from the group consisting of: desktop computers, laptop computers, smartphones, tablets, and Internet of Things (IoT) devices.

In some embodiments, at least one of said devices communicates with at least said other device via a cellular network deploying said at least one of said first NAT and/or second NAT.

In some embodiments, both the first and the second device are communicating via first and second different cellular networks.

In some embodiments, at least one of first and second devices are using one or more cellular connections, each with same or different cellular networks, as associated to a one or more cellular modems associated with it.

In some embodiments, the at least one of the first and second devices that use one or more cellular connections, splits or distributes or allocates (e.g., un-equally, or in a non-equal manner) the IP packets of at least one application that are destined to transmission to said other device, between or among the one or more cellular connections, after puncturing the at least one of first and second NATs.

In some embodiments, the method further comprises: determining the type of NAT configuration employed by the network of the at least one of first device and the network of the second device. In some embodiments, direct network communication is enabled by adjusting the dynamic NAT rules by puncturing it based on the determined type of NAT configurations.

In some embodiments, the method comprises employing a mechanism for detecting and adapting to changes in the NAT configuration of the network of the first device and/or the network of the second device during the communication session.

In some embodiments, the VPN server employs a full-cone or Address Restricted NAT configuration to facilitate the dynamic NAT puncturing. In some embodiments, the VPN connection operates to obfuscate the internal network addresses of the two devices from the public internet, enhancing security of the communication. In some embodiments, the method further includes: dynamically selecting the VPN server based on factors including latency, bandwidth, and geographic location relative to the devices. In some embodiments, the direct network communication enabled by the method is used for applications including voice over internet protocol (VoIP), streaming media, and real-time gaming.

In some embodiments, the VPN connection is configured to automatically reconnect upon detecting a drop or degradation in the established VPN connection.

In some embodiments, the method further comprises: utilization of a message broker to facilitate the exchange of external network addresses between the first computing device and the second computing device.

In some embodiments, the method comprises encrypting data transmitted between the first computing device and the second computing device over the VPN connection. In some embodiments, the VPN connection employs a VPN protocol selected from a group including OpenVPN®, WireGuard®, and L2TP/IPsec; for example, selected based on predetermined criteria including required security level and overhead.

In some embodiments, dynamic NAT rules are applied without requiring administrative access to the router or network configuration settings of the devices' networks. In some embodiments, the STUN protocol or equivalent is employed periodically throughout the communication session to adapt to changes in the external network addresses or port mappings of the computing devices. In some embodiments, the method enables network communication across various NAT types using a VPN-based approach.

Some embodiments may enable communication across network address translation (NAT) systems using STUN protocol and virtual private networks (VPNs) and without relying on conventional TURN protocols. Some embodiments provide a method for network communication, or a method for facilitating network communication between user equipment (UE) devices across network address translation (NAT) systems; comprising: establishing a virtual private network (VPN) to navigate through various NAT types, including symmetric NAT, using a dynamic NAT puncturing technique that operates independently of TURN protocols, and leveraging a session traversal utilities for NAT (STUN) protocol to assist in the establishment of direct communication paths.

Some embodiments provide a system for NAT puncturing, the system configured to enable direct network communication between devices operating behind various/different types of NAT configurations, the system comprising: a VPN server implementing a dynamic NAT puncturing protocol, a plurality of UE devices capable of establishing a VPN connection with said VPN server without utilizing TURN protocols, and a STUN server for determining external address information, wherein the VPN server facilitates NAT puncturing across symmetric and asymmetric NAT types.

Some embodiments provide a network communication device that is configured to bypass network address translation (NAT) restrictions without requiring TURN protocol intervention, comprising: means for establishing a VPN connection utilizing a pre-selected VPN protocol that is suitable/efficient/optimal for NAT puncturing, means for dynamically adjusting NAT traversal techniques, and means for utilizing STUN protocols to facilitate the exchange of external network addresses for direct communication.

Some embodiments provide a method for establishing VPN connections, or for establishing a VPN-based communication link for devices behind NAT systems, the method comprising: selecting a VPN protocol (optionally, based on the detected NAT type, which may be an optional factor in selecting a VPN protocol or a VPN server), establishing a VPN connection to a VPN server, and utilizing a STUN server to facilitate the determination of public IP addresses and port information and to inform the other device of these via a message broker before the NAT is punctured through the VPN communications, wherein the VPN connection precludes the necessity for TURN protocol usage in establishing direct device-to-device communication; and wherein, for example, the application that communicates from at least the first device is decoupled from IP NAT-related protocols, and uses standard Operating System (OS) communication system calls to send and receive IP packets from the other device.

Some embodiments provide a NAT Puncturing protocol or method or process, for puncturing network address translation (NAT) services or systems to enable direct peer-to-peer communication between two or more devices, comprising: a set of instructions executable by electronic devices and/or one or more VPN server(s) and/or a Message Broker, for dynamically generating NAT traversal rules based on real-time network conditions and NAT types, and an instruction set for leveraging STUN protocol services to maintain updated external IP address and port mappings for participating devices.

Some embodiments provide a method for enabling network communication between devices across network address translation (NAT) systems, the method comprising: establishing a VPN connection between a first device and a VPN server, wherein the VPN facilitates employing NAT puncturing techniques; determining external network addresses for both the first device and a second device via a STUN protocol; and configuring NAT traversal rules based on the determined external network addresses to enable direct communication between the first and second devices.

Some embodiments provide a method for facilitating direct network communication between user equipment (UE) devices situated behind NAT systems, the method comprising: dynamically selecting a VPN protocol; establishing a VPN connection using the selected VPN protocol to navigate through NAT constraints; and employing a STUN server to exchange external network addresses between the UE devices, thereby enabling direct communication without the use of TURN and TURN-like protocols.

Some embodiments provide dynamic adaptation to NAT type changes, using a method for maintaining continuous network communication across varying NAT configurations or varying NATs, the method comprising: initiating a VPN-based connection between network devices; periodically assessing the NAT type of each network connection; adjusting VPN and NAT puncturing method re-deployed/re-used in response to changes in NAT type; and utilizing STUN protocol exchanges to update external address mappings.

Some embodiments may optimize or improve communication efficiency between devices behind NAT systems, the method comprising: selecting a VPN type or VPN service or VPN server or VPN configuration optimized for low overhead and high performance based on the NAT type; establishing a VPN connection to perform NAT puncturing without TURN protocol reliance; and conducting periodic STUN protocol checks to refine NAT traversal rules, minimizing latency or maximizing data throughput between the communicating devices.

Some embodiments may provide Security-Enhanced NAT Puncturing, by utilizing a method for enhancing security in network communications across NAT systems, the method comprising: establishing a secure VPN connection employing encryption techniques for NAT puncturing; verifying the integrity and authenticity of communicating devices via a STUN protocol exchange; and implementing dynamic NAT traversal rules.

Some embodiments may integrate NAT Type Detection as a factor in dynamic VPN selection (including no VPN) and/or VPN configuration; for example, using a method for configuring network communication through NAT systems, comprising: automatically detecting the NAT type present in the communication paths of devices; selecting a VPN protocol specifically suited to the detected NAT type; establishing a VPN connection between devices using the selected protocols to enable NAT puncturing; and employing a STUN protocol to exchange external network address information, facilitating device-to-device communication without using TURN protocol.

In accordance with some embodiments, only one of the two communicating devices, such as the Server or the Multimedia Hub device, is the device that connects to a VPN server. The client device can be oblivious to that, and does not require any changes in order to achieve a network connection. In some implementations, the same is true for TURN: only the Server or the Multimedia Hub device connects to the TURN server, and sends to the client device, via the Message Broker, the IP+port information that the TURN server assigned to it. The client device does not know whether it is sending the traffic to a TURN server, or to a VPN server's NAT, or directly to the Server or Multimedia Hub device.

Some embodiments employ Adaptive VPN Connection Management to enable communication across NAT systems, comprising: initiating a connection between the FIG. 7A device 703 (called "server") and the VPN server; based on initial network conditions and NAT configurations; continuously monitoring the performance and stability of the VPN connection; automatically adjusting VPN settings, including protocol and encryption strength, in response to variations in network conditions or NAT configuration changes; and/or dynamically updating NAT traversal rules to maintain optimized, secure, and direct communication between the devices.

Some embodiments may utilize a Multi-VPN architecture for enhanced NAT traversal reliability and availability or efficiency, comprising: establishing multiple VPN connections using different VPN protocols simultaneously for a set of communicating devices; determining the most effective VPN connection for NAT puncturing based on real-time performance metrics and/or previous historical performance data and/or published/manifested capabilities and/or cost and/or user preferences and/or geo-location information and/or NAT types and/or cellular networks or operators and/or instructions from a remote management server; selecting and prioritizing the optimal VPN connection for ongoing communication; and seamlessly switching between VPN connections in response to changes in network conditions or NAT configurations to ensure continuous and efficient direct communication.

Some embodiments enable VPN-Based NAT Puncturing with QoS Optimization, by: establishing a VPN connection between devices to navigate NAT restrictions; applying QoS prioritization rules to the VPN connection to ensure prioritization of critical/high-priority data traffic; utilizing a STUN protocol to facilitate real-time external address mapping and optimization of NAT traversal paths; and adjusting VPN and NAT puncturing parameters dynamically to optimize network traffic flow and maintain high-quality communication standards across varying NAT types.

Some embodiments may utilize a system that includes some or all of the following components: (1) a User Equipment (UE) Device, such as a computing device (e.g., smartphone, laptop) that initiates or receives communication or a multi-modem cellular "bonding" video transceiver device or others; it may be equipped with software or a module to manage/establish/modify/maintain/create/control VPN connections and NAT traversal. (2) VPN Client Software or module, installed on the UE Device; enables the establishment of secure VPN connections and used for bypassing NAT restrictions. (3) NAT Type Detection Unit, which analyses the network to determine the type of NAT implemented (e.g., Full Cone, Symmetric). (4) VPN Protocol Selector, for dynamically selecting the optimal VPN protocol based on the detected NAT type or any of the other parameters listed in this invention so to ensure efficient NAT traversal. (5) VPN Server, a standard/regular central unit that manages VPN connections from multiple UE devices, being used by this invention to facilitate NAT puncturing for direct communication. (6) a STUN Server, which assists devices in discovering their public IP addresses and ports, used for setting up direct communications paths. (7) Dynamic NAT Puncturing Module, which configures and adjusts NAT traversal rules in real-time to set and maintain communication channels. (8) Encryption Unit, which ensures all data transmitted over VPN connections is securely encrypted, protecting the integrity and confidentiality of communications. (9) Quality of Service (QoS) Manager or Controller, which prioritizes traffic over the VPN connection, ensuring that important data packets receive higher priority and bandwidth. (10) VPN Connection Monitor, which continuously or periodically evaluates the performance and stability of VPN connections, making adjustments as needed to maintain satisfactory or optimal or efficient communication. (11) Session Management Unit, which manages communication sessions between devices, including initiation, maintenance, and termination of VPN-based connections. (12) Network Condition Analyzer, which monitors and/or estimated and/or measures and/or predicts current or future or real-time network conditions (e.g., bandwidth, goodput, latency, packet loss, error rate) to adjust VPN and NAT puncturing or packet routing settings dynamically. (13) Traffic Encryption/Decryption Unit, which encrypts outgoing data and decrypts incoming data packets to ensure secure transmission across public networks. (14) Multi-VPN Management Unit, which handles multiple VPN connections using different protocols simultaneously, selecting the most effective pathway routing for communication. (15) Adaptive Protocol Switching Unit, which automatically switches between VPN protocols in response to changing network conditions and/or changing NAT configurations or any of the parameters mentioned elsewhere. (16) Bandwidth Optimization Unit, to dynamically allocate bandwidth among different communication links to maximize throughput and reduce latency, such as by distributing IP packets among communication sessions/transceivers/communication links/cellular identity profiles/SIMs/IP addresses/VPN connections. (17) Firewall Traversal Unit, which may negotiate with network firewalls, enabling packets to bypass them without compromising security. (18) Peer Discovery Unit, which facilitates the identification and connection between devices wishing to communicate, working in tandem with the STUN server. (20) Performance Reporting Unit, which collects and reports data on the performance of the NAT puncturing process, providing insights for further optimization or future utilization and sharing. (20) Optionally a Load Balancer, to distribute incoming VPN connection requests among multiple VPN servers based on current load, thereby optimizing resource usage and minimizing response times. (21) a Dynamic Routing Engine, which dynamically determines the most efficient paths for data packets to travel through the VPN, adjusting routes in real time based on network congestion and link health, and/or based on modifications to NAT services being employed or modified. (22) VPN Configuration Repository, which stores configurations for various VPN protocols and settings, allowing quick adaptation to different NAT types and network conditions. (23) Network Interface Monitor, to monitor the changes in the network interfaces of UE devices, such as switching from mobile data to Wi-Fi or from one cellular network to another, to reconfigure VPN connections accordingly. (24) Data Compression Unit, to compress and/or encode and/or encrypt data before transmission over the VPN in order to reduce bandwidth usage and increase transmission speed. (25) Security Policy Manager, which may define and enforce security policies for VPN connections, including authentication protocols, encryption standards, and access controls. (26) a NAT Keep-Alive Mechanism, which may send periodic signals/packets through the VPN to keep NAT mappings alive, ensuring that established communication paths remain open for the duration of the session. (27) Traffic Shaping Module, which manages the flow of data across the multiple VPN servers to prioritize critical applications and manage bandwidth consumption effectively. (28) Public Key Infrastructure (PKI) unit, to manage digital certificates and public keys for the relevant devices, ensuring secure and verified communications over the VPN. (29) Usage Analytics and Reporting Engine, which may collect and analyse data about system usage, performance metrics, and efficiency, providing insights for optimization and scaling. (39) User Interface component to allow setting, configuring, monitoring, analysing, storing and/or billing in real time and/or offline data related to the communication and/or the VPN and/or the NAT puncturing.

Some embodiments may provide Dynamic VPN Protocol Selection: the system automatically chooses the most suitable VPN protocol based on the detected NAT type, optimizing the path for data packets and ensuring efficient, reliable communication across various network configurations.

Some embodiments may provide Adaptive NAT Puncturing: the system utilizes a mechanism to dynamically adjust NAT traversal techniques in real-time, ensuring uninterrupted communication despite changes in NAT configurations or network conditions.

Some embodiments may provide an integrated STUN-and-VPN system, which seamlessly combines STUN protocol functionalities with VPN server(s) to discover and to broker the public IP addresses and ports of devices, facilitating device-to-device NAT-puncturing/NAT-penetrating communication without intermediate TURN servers.

Some embodiments may provide Automated Network Condition Adaptation, as the system monitors network conditions continuously, automatically adjusting VPN settings, including encryption and compression, to maintain optimal performance and minimize latency and packet loss.

Some embodiments may provide Multi-VPN Management by a single electronic device, which uses and manages multiple VPN connections simultaneously, employing different protocols to create redundancy and enhance reliability, availability and/or low latency, ensuring communication continuity even if one VPN pathway fails.

Some embodiments may provide Quality of Service (QoS) Optimization, in a system that prioritizes traffic over VPN connections, ensuring that critical data packets, such as those for VoIP calls or streaming media, receive higher priority over less sensitive data.

Some embodiments provide encryption and security enhancement, in a system that employs encryption standards within the VPN to secure data transmission across public networks, safeguarding against interception and unauthorized access.

Some embodiments may provide or may use Load Balancing and Resource Optimization or other packet stream splitting mechanism or packet distribution mechanism or packet allocation mechanism between multiplicity of established communication links with established multiplicity of VPN servers, and may use a load balancer that distributes incoming VPN connections across multiple servers based on current load, optimizing resource usage and enhancing system scalability.

Some embodiments provide Real-time Performance Analytics, using a module that collects and analyses performance data in real time, providing insights into system efficiency, connection stability, and user experience, facilitating proactive adjustments and improvements.

Some embodiments provide system comprising: a first electronic device, that comprises at least: a hardware processor that is configured to execute code, and a memory unit that is configured to store code; wherein the first electronic device runs a first application, that is configured to send a first set of Internet Protocol (IP) packets to a second application running on a second electronic device, and that expects to receive a second set of IP packets from said second application; wherein the second electronic device runs the second application, that expects to receive the first set of IP packets from the first application, and that is configured to send the second set of IP packets to the first application; wherein the second set of IP packets is routed, from the second electronic device to the first electronic device, via a first Network Address Translation (NAT) service; wherein said first NAT service is a Symmetric NAT service.

In some embodiments, at least one of the first application and the second application, requires to puncture said first NAT service, in order to establish or maintain communication with the other of the first application and the second application. The first electronic device is configured to execute a first Session Traversal Utilities for NAT (STUN) protocol, which provides to the first electronic device a first pair of external IP address and port of the first electronic device. Optionally, the second electronic device is configured to execute a Session Traversal Utilities for NAT (STUN) protocol, which provides to the second electronic device a second pair of external IP address and port of the second electronic device. The system comprises a Message Broker Unit, which is accessible via the public Internet to both the first electronic device and the second electronic device. The first electronic device is configured to send a first informing message, to said Message Broker Unit; wherein the first informing message indicates therein the first pair of external IP address and port of the first electronic device; wherein the Message Broker Unit provides the first informing message to the second electronic device. The second electronic device is configured to send a second informing message, to said Message Broker Unit; wherein the second informing message indicates therein the second pair of external IP address and port of the second electronic device; wherein the Message Broker Unit provides the second informing message to the first electronic device; The first electronic device utilizes a Virtual Private Network (VPN) function, to communicate via a first VPN server, with the second electronic device by using packets for NAT puncturing and setting their destination address to the second pair of external IP address and port of the second electronic device that were indicated to the first electronic device by the second informing message via the Message Broker Unit. The second electronic device communicates with the first electronic device by using packets for NAT puncturing and setting their destination address to the first pair of external IP address and port of the first electronic device that were indicated to the second electronic device by the first informing message via the Message Broker Unit. After said communications using addresses and ports received from the Message Broker Unit, the second electronic device sends a first subset of said IP packets of said second application to said first application by setting their destination IP address to one of: (a) IP address of said first electronic device as received from said Message Broker Unit, or (b) a source IP address as obtained from incoming puncturing packets that were received at the second electronic device from said first electronic device, or (c) a source IP address as obtained from packets of said first application that were received at the second electronic device from the first electronic device. The first electronic device sends a subset of said first set of IP packets to said second application running on said second electronic device, by setting their destination IP address to: a source IP address as obtained from the subset of IP packets that were received at the first electronic device from said second application of the second electronic device.

In some embodiments, utilization of the first VPN function by the first electronic device penetrates the first NAT service, and enables communication, without utilization of and without reliance on Traversal Using Relays around NAT (TURN) protocols, between the first application and the second application based on the first pair of external IP address and port and the second pair of external IP address and port.

In some embodiments, the second electronic device is configured to send a User Datagram Protocol (UDP) packet directly to the first pair of external IP address and port of the first electronic device; wherein the first electronic device and the second electronic device exchange IP packets utilizing said first VPN function for the puncturing of said Symmetric NAT, in a communication process that is application-agnostic and does not require any modifications to the first application or to the second application.

In some embodiments, the second electronic device communicates via a connected first cellular transceiver with the first electronic device; wherein the second electronic device communicates uses the first pair of external IP address and port of the first electronic device as the IP destination address in the packets it sends to said first electronic device.

In some embodiments, the said second application communicates via two or more cellular transceivers connected to said second device with the first application; wherein one or more VPN functions are utilized by the first electronic device to puncture NAT services for each cellular transceiver separately.

In some embodiments, the second set of IP packets are sent from the second application to the first application, by distributing the second set of IP packets for transmission in concert by two or more cellular transceivers used by the second electronic device upon puncturing of one or more NAT services that are between the first electronic device and the second electronic device.

In some embodiments, said first electronic device is using the Internet via a second NAT service; wherein utilization of the first VPN, penetrates both: (a) the second NAT service which is of any type of NAT service, and (b) said first NAT service which is a Symmetric NAT.

In some embodiments, said first electronic device is using the Internet via a second NAT service; wherein utilization of the first VPN function, penetrates both: (a) the first NAT service which is a Symmetric NAT type of service, and (b) the second NAT service which is a Non-Symmetric NAT service.

In some embodiments, said first electronic device is using the Internet via a second NAT service; wherein utilization of the first VPN function, penetrates any combination of: (a) the first NAT service being symmetric or non-symmetric or absent, and (b) the second NAT service being symmetric or non-symmetric or absent.

In some embodiments, penetration of the first NAT service, and penetration of the second NAT service, enables communication between: said first application running on said first electronic device which utilizes a first cellular transceiver, and said second application running on said second electronic device which utilizes a second cellular transceiver where first and second cellular transceivers may be using the same or different cellular network.

In some embodiments, penetration of the second NAT service, enables communication between: said first application running on said first electronic device which utilizes a first Wi-Fi transceiver, and said second application running on said second electronic device which utilizes a second Wi-Fi transceiver.

In some embodiments, penetration of the second NAT service enables communication between: said second application running on said second electronic device which utilizes a cellular transceiver, and said first application running on said first electronic device which utilizes a non-cellular transceiver.

In some embodiments, penetration of the second NAT service, enable communication between: (a) said first electronic device, which utilizes two transceivers in parallel for simultaneous transmission of said first set of IP packets, and (b) said second electronic device, which utilizes two transceivers in parallel for simultaneous transmission of said second set of IP packets; wherein each of said cellular transceivers uses the same or a different cellular network as the other cellular transceivers; wherein each of said cellular transceivers has an IP address within the cellular network that is different than their external IP addresses; wherein IP address translation or mapping between internal and external IP addresses is performed by one or more NAT services; wherein each of the NAT services, used by each of the cellular transceivers, is the same or different than the other NAT services used by the other cellular transceivers; wherein each of the NAT services is of a type selected from the group consisting of: (i) symmetric NAT service, (ii) non-symmetric NAT service, (iii) absent or non-existent or deactivated NAT service.

In some embodiments, a first VPN selection module associated with the first electronic device selects which VPN server to utilize, from a pool of available and pre-configured VPN servers, based on a VPN-selection algorithm that takes into account at least one of: a measured or estimated performance characteristic of each VPN, a measured or estimated load of each VPN, a measured or estimated latency of each VPN, a measured or estimated Round-Trip Time (RTT) value of each VPN, a measured or estimated packet loss rate of each VPN, a measured or estimated jittery behavior indicator of each VPN, a measured or estimated cost of each VPN, a measured or estimated geo-location data of each VPN, identity profile of said first network, identity profile of a transceiver associated with said first electronic device and used for the communication from said first electronic device.

In some embodiments, the VPN functions that are utilized for puncturing the first or the second NAT services are selected from the group that includes at least: Point-to-Point Tunneling Protocol (PPTP), OpenVPN®, remote access VPN protocol, peer-to-peer VPN protocol, site-to-site VPN protocols, L2TP/IPsec, WireGuard®.

In some embodiments, said second application that runs on the second electronic device is a client-side application; wherein said first application that runs on the first electronic device is a server-side application that is configured to serve in parallel at least two client-side applications residing on at least two different electronic devices.

In some embodiments, the first electronic device is configured to automatically switch, from utilizing a first VPN server for penetrating the first or second NAT services, to utilizing a second, different, VPN server for penetrating the first or second NAT services, in response to a detection that one or more of the NAT services was modified or replaced or the IP packet routing has degraded below a threshold.

In some embodiments, the first electronic device is configured to dynamically switch, from utilizing a first VPN server for penetrating the first or second NAT services, to utilizing a second, different, VPN server for penetrating the first or second NAT services, in response to a detection that a performance characteristic of the first VPN server or the IP traffic through it has decreased to below a pre-defined threshold value.

Some embodiments provide a method for puncturing one or more Network Address Translation (NAT) services, that are located between a first electronic device and a second electronic device; wherein the first electronic device comprises at least: a hardware processor that is configured to execute code, and a memory unit that is configured to store code; wherein the first electronic device runs a first application, that is configured to send a first set of Internet Protocol (IP) packets to a second application running on a second electronic device, and that expects to receive a second set of IP packets from said second application; wherein the second electronic device runs the second application, that expects to receive the first set of IP packets from the first application, and that is configured to send the second set of IP packets to the first application; wherein the second set of IP packets is routed, from the second electronic device to the first electronic device, via a first Network Address Translation (NAT) service; wherein said first NAT service is a Symmetric NAT service; wherein at least one of the first application and the second application, requires to puncture said first NAT service, in order to establish or maintain communication with the other of the first application and the second application.

In some embodiments, the method comprises some or all of the following operations: at the first electronic device, executing a first Session Traversal Utilities for NAT (STUN) protocol, which provides to the first electronic device a first pair of external IP address and port of the first electronic device; at the second electronic device, executing a Session Traversal Utilities for NAT (STUN) protocol, which provides to the second electronic device a second pair of external IP address and port of the second electronic device; wherein a Message Broker Unit is accessible via the public Internet to both the first electronic device and the second electronic device; at the first electronic device, sending a first informing message to said Message Broker Unit; wherein the first informing message indicates therein the first pair of external IP address and port of the first electronic device; wherein the Message Broker Unit provides the first informing message to the second electronic device; at the second electronic device, sending a second informing message to said Message Broker Unit; wherein the second informing message indicates therein the second pair of external IP address and port of the second electronic device; wherein the Message Broker Unit provides the second informing message to the first electronic device; at the first electronic device, utilizing a Virtual Private Network (VPN) function, to communicate via a first VPN server, with the second electronic device by using packets for NAT puncturing and setting their destination address to the second pair of external IP address and port of the second electronic device that were indicated to the first electronic device by the second informing message via the Message Broker Unit; at the second electronic device, communicating with the first electronic device by using packets for NAT puncturing and setting their destination address to the first pair of external IP address and port of the first electronic device that were indicated to the second electronic device by the first informing message via the Message Broker Unit; performing, after said communications using addresses and ports received from the Message Broker Unit, at the second electronic device: sending a first subset of said IP packets of said second application to said first application by setting their destination IP address to one of: (a) IP address of said first electronic device as received from said Message Broker Unit, or (b) a source IP address as obtained from incoming puncturing packets that were received at the second electronic device from said first electronic device, or (c) a source IP address as obtained from packets of said first application that were received at the second electronic device from the first electronic device; at the first electronic device, sending a subset of said first set of IP packets to said second application running on said second electronic device, by setting their destination IP address to: a source IP address as obtained from the subset of IP packets that were received at the first electronic device from said second application of the second electronic device.

The system(s) of some embodiments may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touchscreen, keyboard, keypad, stylus, mouse, touchpad, joystick, trackball, microphones), output units (e.g., screen, touchscreen, monitor, display unit, audio speakers), acoustic sensor(s), optical sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Rust, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Perl, Python, PHP, Dart, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments may perform steps or operations such as, for example, "determining", "identifying", "comparing", "checking", "querying", "searching", "matching", "estimating", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated or collected data, and one or more values as stored in a look-up table or a legend table or a list of reference value(s) or a database of reference values or a ranges of reference-values; a comparison or matching or searching process which searches for matches and/or identical results and/or similar results and/or sufficiently-similar results (e.g., within a pre-defined threshold level of similarity; such as, within 5 percent above or below a pre-defined threshold value), among multiple values or limits that are stored in a database or look-up table or that are defined by comparison rules or matching rules; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:
1. A system comprising:
a first electronic device;
a second electronic device; and a Message Broker that is accessible via the public Internet to both the first electronic device and the second electronic device;

wherein the first electronic device runs a first application that is configured to send a first set of Internet Protocol (IP) packets to a second application running on a second electronic device and to receive a second set of IP packets from said second application;

wherein the second electronic device runs the second application that is configured to receive the first set of IP packets from the first application and to send the second set of IP packets to the first application;

wherein the second set of IP packets is routed, from the second electronic device to the first electronic device, via a first Network Address Translation (NAT) service;

wherein at least one of the first application and the second application requires puncturing of said first NAT service in order to establish or maintain communication with the other of the first application and the second application;

wherein the first electronic device is configured to execute Session Traversal Utilities for NAT (STUN) protocol to obtain a first pair of external IP address and port of the first electronic device;

wherein the second electronic device is configured to execute the STUN protocol to obtain a second pair of external IP address and port of the second electronic device;

wherein the first electronic device is configured to send a first informing message to said Message Broker, wherein the first informing message indicates the first pair of external IP address and port of the first electronic device;

wherein the Message Broker provides the first informing message to the second electronic device;

wherein the second electronic device is configured to send a second informing message to said Message Broker, wherein the second informing message indicates the second pair of external IP address and port of the second electronic device;

wherein the Message Broker provides the second informing message to the first electronic device;

wherein the first electronic device utilizes a Virtual Private Network (VPN) function to communicate with the second electronic device by sending, via a first VPN server, packets for NAT puncturing addressed to the second pair of external IP address and port of the second electronic device that were indicated to the first electronic device by the second informing message via the Message Broker;

wherein the second electronic device communicates with the first electronic device by sending packets for NAT puncturing addressed to the first pair of external IP address and port of the first electronic device that were indicated to the second electronic device by the first informing message via the Message Broker;

wherein, after communications using addresses and ports received from the Message Broker, the second electronic device sends a subset of said second set of IP packets of said second application to said first application by setting their destination IP address to one of: (a) the external IP address of said first electronic device as received from said Message Broker, or (b) a source IP address as obtained from incoming puncturing packets that were received at the second electronic device from said first electronic device, or (c) a source IP address as obtained from packets of said first application that were received at the second electronic device from the first electronic device;

wherein the first electronic device sends a subset of said first set of IP packets to said second application running on said second electronic device by setting their destination IP address to a source IP address as obtained from the subset of said second set of IP packets that were received at the first electronic device from said second application of the second electronic device.

2. The system of claim 1, wherein utilization of the VPN function by the first electronic device penetrates the first NAT service, and enables communication between the first application and the second application based on the first pair of external IP address and port and the second pair of external IP address and port, without utilization of and without reliance on Traversal Using Relays around NAT (TURN) protocols.

3. The system of claim 2, wherein the second electronic device is configured to send a User Datagram Protocol (UDP) packet directly to the first pair of external IP address and port of the first electronic device;

wherein the first electronic device and the second electronic device exchange IP packets utilizing said VPN function for the puncturing of said first NAT service in a communication process that is application-agnostic and does not require any modifications to the first application or to the second application.

4. The system of claim 3, wherein the second electronic device communicates via a connected first cellular transceiver with the first electronic device;

wherein the second electronic device communicates using the first pair of external IP address and port of the first electronic device as the destination address in the IP packets it sends to said first electronic device.

5. The system of claim 3, wherein the said second application communicates via two or more cellular transceivers connected to said second electronic device with the first application;

wherein one or more VPN functions are utilized by the first electronic device to puncture NAT services for each cellular transceiver separately.

6. The system of claim 1, wherein the second set of IP packets are sent from the second application to the first application by distributing the second set of IP packets for transmission in concert by two or more cellular transceivers used by the second electronic device upon puncturing of one or more NAT services that are between the first electronic device and the second electronic device.

7. The system of claim 1, wherein said second electronic device is using the Internet via a second NAT service;

wherein utilization of the VPN function penetrates both: (a) the second NAT service, which is of any type of NAT service, and (b) said first NAT service, which is a symmetric NAT service.

8. The system of claim 1, wherein said second electronic device is using the Internet via a second NAT service;

wherein utilization of the VPN function penetrates both: (a) the first NAT service, which is a symmetric NAT service, and (b) the second NAT service, which is a non-symmetric NAT service.

9. The system of claim 1, wherein said second electronic device is using the Internet via a second NAT service;

wherein utilization of the VPN function penetrates any combination of: (a) the first NAT service being one of a symmetric NAT service, a non-symmetric NAT service, and absent, and (b) the second NAT service being one of a symmetric NAT service, a non-symmetric NAT service, and absent.

10. The system of claim 9, wherein penetration of the first NAT service and the second NAT service enables communication between said first application running on said first electronic device, which utilizes a first cellular transceiver, and said second application running on said second electronic device, which utilizes a second cellular transceiver, wherein the first cellular transceiver and the second cellular transceiver may be using the same cellular network or different cellular networks.

11. The system of claim 9, wherein penetration of the second NAT service enables communication between said first application running on said first electronic device, which utilizes a first Wi-Fi transceiver, and said second application running on said second electronic device, which utilizes a second Wi-Fi transceiver.

12. The system of claim 9, wherein penetration of the second NAT service enables communication between said second application running on said second electronic device, which utilizes a cellular transceiver, and said first application running on said first electronic device, which utilizes a non-cellular transceiver.

13. The system of claim 9, wherein penetration of the second NAT service enables communication between: (a) said first electronic device, which utilizes two cellular transceivers in parallel for simultaneous transmission of said first set of IP packets, and (b) said second electronic device, which utilizes two cellular transceivers in parallel for simultaneous transmission of said second set of IP packets;

wherein each of said cellular transceivers uses the same or a different cellular network as the other cellular transceivers;

wherein each of said cellular transceivers has an IP address within the cellular network that is different than their external IP addresses;

wherein IP address translation or mapping between internal and external IP addresses is performed by one or more NAT services;

wherein each of the one or more NAT services, used by each of the cellular transceivers, is the same or different than the other NAT services used by the other cellular transceivers;

wherein each of the one or more NAT services is of a type selected from the group consisting of: (i) a symmetric NAT service, (ii) a non-symmetric NAT service, (iii) an absent, non-existent or deactivated NAT service.

14. The system of claim 13, wherein the VPN function that is utilized to penetrate both the first NAT service and the second NAT service is selected from the group that includes at least:

Point-to-Point Tunneling Protocol (PPTP),

Open VPN, remote access VPN protocol, peer-to-peer VPN protocol, site-to-site VPN protocols,

L2TP,

WireGuard.

15. The system of claim 13, wherein the first electronic device is configured to automatically switch, from utilizing the first VPN server for penetrating the first or second NAT services, to utilizing a second, different, VPN server for penetrating the first or second NAT services in response to a detection that one or more of the NAT services was modified or replaced or IP packet routing by the first VPN server has degraded below a threshold.

16. The system of claim 1, wherein said second application that runs on the second electronic device is a client-side application;

wherein said first application that runs on the first electronic device is a server-side application that is configured to serve at least two client-side applications residing on at least two different electronic devices in parallel.

17. The system of claim 1, wherein the first electronic device is configured to dynamically switch, from utilizing the first VPN server for penetrating the first or second NAT services, to utilizing a second, different, VPN server for penetrating the first or second NAT services in response to a detection that a performance characteristic of the first VPN server has decreased to below a pre-defined threshold value.

18. A method for puncturing one or more Network Address Translation (NAT) services that are located between a first electronic device and a second electronic device, wherein the first electronic device runs a first application that is configured to send a first set of Internet Protocol (IP) packets to a second application running on a second electronic device and to receive a second set of IP packets from said second application, wherein the second electronic device runs the second application that is configured to receive the first set of IP packets from the first application and to send the second set of IP packets to the first application, wherein the second set of IP packets is routed, from the second electronic device to the first electronic device, via a first Network Address Translation (NAT) service, wherein at least one of the first application and the second application requires puncturing of said first NAT service in order to establish or maintain communication with the other of the first application and the second application, and wherein a Message Broker is accessible via the public Internet to both the first electronic device and the second electronic device, the method comprising:

at the first electronic device, executing Session Traversal Utilities for NAT (STUN) protocol to obtain a first pair of external IP address and port of the first electronic device;

at the second electronic device, executing the STUN protocol to obtain a second pair of external IP address and port of the second electronic device;

at the first electronic device, sending a first informing message to said Message Broker, wherein the first informing message indicates the first pair of external IP address and port of the first electronic device;

providing, by the Message Broker, the first informing message to the second electronic device;

at the second electronic device, sending a second informing message to said Message Broker, wherein the second informing message indicates the second pair of external IP address and port of the second electronic device;

providing, by the Message Broker, the second informing message to the first electronic device;

at the first electronic device, utilizing a Virtual Private Network (VPN) function to communicate with the second electronic device by sending, via a first VPN server, packets for NAT puncturing addressed to the second pair of external IP address and port of the second electronic device that were indicated to the first electronic device by the second informing message via the Message Broker;

at the second electronic device, communicating with the first electronic device by sending packets for NAT puncturing addressed to the first pair of external IP address and port of the first electronic device that were indicated to the second electronic device by the first informing message via the Message Broker;

at the second electronic device, after communications using addresses and ports received from the Message Broker, sending a subset of said second set of IP packets of said second application to said first application by setting their destination IP address to one of: (a) the external IP address of said first electronic device as received from said Message Broker, or (b) a source IP address as obtained from incoming puncturing packets that were received at the second electronic device from said first electronic device, or (c) a source IP address as obtained from packets of said first application that were received at the second electronic device from the first electronic device;

at the first electronic device, sending a subset of said first set of IP packets to said second application running on said second electronic device by setting their destination IP address to a source IP address as obtained from the subset of said second set of IP packets that were received at the first electronic device from said second application of the second electronic device.

19. A non-transitory storage medium having instructions stored thereon that, when executed by a machine, cause the machine to perform the method of claim 18.

* * * * *